Feb. 28, 1950 C. E. BEACH 2,498,639

SIGNAL MANIFESTING AND/OR REPEATING EQUIPMENT COMMON TO A GROUP OF CODE SIGNAL ORIGINATING CIRCUITS

Filed Dec. 4, 1946 7 Sheets-Sheet 1

INVENTOR

C. E. Beach

INVENTOR
C. E. Beach

Feb. 28, 1950 C. E. BEACH 2,498,639

SIGNAL MANIFESTING AND/OR REPEATING EQUIPMENT COMMON TO A GROUP OF CODE SIGNAL ORIGINATING CIRCUITS

Filed Dec. 4, 1946 7 Sheets-Sheet 3

INVENTOR
C. E. Beach

INVENTOR
C. E. Beach

INVENTOR
C. E. Beach

INVENTOR
C. E. Beach

Feb. 28, 1950 C. E. BEACH 2,498,639
SIGNAL MANIFESTING AND/OR REPEATING EQUIPMENT COMMON
TO A GROUP OF CODE SIGNAL ORIGINATING CIRCUITS
Filed Dec. 4, 1946 7 Sheets-Sheet 7

INVENTOR
C. E. Beach

Patented Feb. 28, 1950

2,498,639

UNITED STATES PATENT OFFICE 2,498,639

SIGNAL MANIFESTING AND/OR REPEATING EQUIPMENT COMMON TO A GROUP OF CODE SIGNAL ORIGINATING CIRCUITS

Clarence E. Beach, Binghamton, N. Y.

Application December 4, 1946, Serial No. 714,090

28 Claims. (Cl. 177—354)

This invention relates to signaling systems, and, more particularly, to signal manifesting and/or repeating equipment common to a group of code signal originating circuits.

Certain features of this invention may be utilized to special advantage in municipal fire alarm central offices of the type in which one or more operators are constantly in attendance. Such offices will be hereinafter referred to as "attended."

In such attended central offices, it is customary to arrange the equipment so that signals received over originating circuits will reach responding personnel of the fire department only after a transmitting instrument ("transmitter") has been manually conditioned ("set") for formulating the code signal of the active calling station and has thereafter been started in operation.

It is highly desirable that whenever an operator has so set such a transmitter, and is about to start it in operation, he shall be enabled to compare his setting with a recordal of the code signal produced directly responsive to the originating circuit. To this end, it is customary that such attended offices comprise signal recording facilities for independent response to respective originating circuits. However, when there are many such circuits, the locations of the records produced in response to some of such circuits will render them unavailable for examination by the operator while he remains at the transmitter.

Valuable time is lost if, after setting the transmitter and before he starts it in action, the operator travels to and from a more or less distant portion of his office for the purpose of verifying the correctness of his setting by reference to a tape record made in direct response to the circuit in which the signal originated.

Furthermore, chances for error are increased when the operator is unable to make side-by-side comparison of such a setting with a record made directly from the incoming signal, but must depend upon memory of the setting he has made when going to the record, and depend upon memory of the record when returning to the transmitter; the likelihood of error being distinctly increased if, at such a time, other signals are being audibly manifested and thus tend to confuse the operator insofar as he senses them.

For these reasons, it is desirable that what is, in a sense, a summary or consolidation of records directly responsive to incoming signals shall be compactly provided in conveniently accessible relationship to such transmitters.

Such consolidation of records serves a further advantageous purpose by avoiding occasion for supplying as many times and date stamps as there are recorders for response to the various originating circuits. Not only is it a fact that use of such stamps sufficiently numerous to assure independently giving needful time and date records for each of the originating circuits involves first cost and expense of maintenance so great as to be considered prohibitive in many instances; but, in addition to the matter of such costs, there is a serious maintenance problem in keeping a comparatively larger number of time stamps in absolutely accurate step. The importance of such accuracy for this type of service arises from the fact that when such time stamps are out of step, even so much as one minute, there may be rather serious consequences.

For example, should an operator exercise proper discretion by delaying or suppressing certain calls, as duplicating a call previously sent out, he would be in danger of being unjustly blamed if time stamp records erroneously made it appear that calls so delayed or suppressed were recorded one or more minutes earlier than such call as he sent out.

It is, therefore, an important object of this invention to provide, for a multi-originating circuit signaling system, means for governing registering equipment common to a group of originating circuits, which means will be superior to prior mechanism for similar purpose in simplicity, inexpensiveness, and capability of successful manufacture and maintenance by persons of ordinary skill, and which will not only assure accurate response of such common equipment to the code signal of any one originating circuit during inactivity and ordinary conditioning of all other originating circuits, but, further, will be suited for embodiment in forms which assure that the code signal of at least one of a plurality of concurrently active originating circuits will fully and correctly govern such common register equipment even though one or more associated originating circuits had previously become defective, as by rupture.

The originating circuits utilized in some fire alarm central offices comprise alternative current paths which may be of independent significance during line faults, although there may be no occasion to produce records in response to more than one of such paths during usual circuits conditioning. Examples of originating circuits having such alternative paths are found in my Patents No. 2,018,656, dated October 29, 1935 and No. 2,034,017, dated March 17, 1936.

Not only is the cost deemed objectionably great for time stamp equipment for such number of registering mechanisms as would be needed in order to provide for independent response to each of the various alternative paths of all of such circuits, but there has been a disposition to fail to provide recording equipment in constant responsive association with respective ones of all of such paths. In the place of such comprehensive equipment, there has been provided some portable recording equipment which may be manually associated with usually insignificant paths when there has been recognition of the need for so doing. Reliance upon such manual association has been found to at times, invite losses of important calls.

It is, therefore, another purpose to provide means whereby diverse signals received through respective paths of any multi-path originating circuit will be independently, fully and correctly responded to by register equipment common to such paths.

Some of the alternative paths just referred to are ordinarily open, while others are usually closed; although, in the interpretation of the signals received over all of such paths, occasions of circuit interruption are of principal significance.

Because of such diverse alternative path characteristics, continuous energization has been needful for controlling magnets of release or equivalent mechanisms associated either with the ordinarily open or the ordinarily closed paths, in relay type repeating equipment or other means heretofore provided for associating recording equipment common to all of such paths. Such continuous energization has absorbed electrical energy to an extent which increases with the number of paths having such alternative characteristics, and, hence, becoming objectionably great when there is provision for a comparatively large number of such circuits.

It is, therefore, still another object of this invention to provide recording equipment suitable for association in common to the alternative paths of circuits having the aforesaid characteristics, and in which constant current drain for local magnet energization may be eliminated, and any current incident to energization of magnets of local devices will not increase with the number of alternative paths or circuits.

Arrangements have heretofore been provided whereby what may be termed "a general register" has been associated with a plurality of originating circuits for response to any active one of such circuits. This result has been obtained by utilization of so-called "repeating equipment," which equipment has been of a character suited for responding to signal formulation in any active one of the originating circuits for effecting the formulation of such signals in one or more so-called "alarm circuits," which alarm circuits communicate with distant fire houses. Equipment suited for either or both of such utilizations will be hereinafter referred to, in some instances as "general registering/receiving equipment," and, in other instances, as "general equipment."

In some prior systems such general equipment has been so associated with originating circuits that it is likely to fail to intelligibly manifest any of the code signals of concurrently active originating circuits. Other of such prior equipments have been of the so-called "automatic repeater-relay type" wherein a circuit which governed general equipment was rendered responsive to any signal originating circuit which was first active upon a given occasion and such circuit would thereafter control such general equipment to the exclusion of other circuits in which concurrent signal formulation subsequently started. An example of such systems is found in my Patent No. 1,602,065, dated October 5, 1926. However, the manufacture and maintenance of such prior automatic repeater type systems has been found to incur objectionably large initial costs, besides involving need for maintenance personnel of exceptional training and skill.

Although, in attended fire alarm central offices, occasions are very infrequent when calls are received concurrently over two or more originating circuits, it is sometimes desirable that general manifesting/repeating equipment in such offices shall correctly respond to code signals concurrently formulated in each of two originating circuits, besides disclosing the order of their commencement.

It is, therefore, a further object to provide, in registering/repeating equipment of the character hereinbefore referred to, construction and arrangement such as will assure that, in the event that a plurality of signal originating circuits or paths are concurrently active, the signals of at least two of such circuits will be fully and intelligibly responded to by such equipment.

Insofar as concurrent activity of more than two originating circuits results from duplication of calls for a single fire or other emergency, there is little if any practical benefit from having such general equipment respond to all of such calls. If, however, such multi-circuit activity results from attempts to summon aid at widely separated places, it becomes desirable that such recording mechanism shall respond to calls from those of the originating circuits which connect calling stations in areas most widely separated.

It is, therefore, another object of this invention to provide means whereby a predetermination may be effected as to which two of any group of concurrently active originating circuits will be fully and clearly responded to by equipment common to such circuits.

As already referred to, the customary procedure in attended fire alarm central offices is such that signals received over originating circuits do not reach the responding personnel of the fire department until a transmitter has been manually set and started in operation; thus incurring a distinct delay in the response of the fire department. Such retransmission delay is considered to be justifiable and, in fact, quite necessary, at times when repairs or tests are being conducted on originating circuits, as well as when such circuits are exposed to exceptional adverse weather or other conditions and during an extensive fire or following a serious storm or other disaster, or other occasions when there is likelihood of a multiplicity of concurrent signals. However, need for reliance upon manual retransmission exists only upon infrequent occasions and then for comparatively short times; so that, at nearly all times, response of fire department personnel would be distinctly expedited by the use of facilities whereby current paths such as those which should govern general manifesting equipment at fire alarm headquarters may safely be utilized for causing signals of originating circuits to reach fire houses without manual intervention.

Furthermore, in attended offices, emergency conditions (such as sudden illness of an operator) sometimes arise which would render it very beneficial if the equipment could expeditiously be so conditioned that, as a temporary emergency measure, the responding personnel of the fire department would receive calls from originating circuits without manual intervention.

In this connection it should be noted that two groups or classes of circuits are utilized in nearly all fire alarm systems of the attended type for carrying alarms from a central office to the various fire department houses. Hence, if and when the central office of a system having such duplicate alarm circuits is conditioned for repeating calls from originating circuits to fire department personnel without manual intervention, it would be desirable that, should calls concurrently originate in two circuits or paths, such calls would be repeated, without manual intervention over alarm circuits of one and the other of such classes, respectively.

It is, therefore, an important object of this invention to provide a signaling system which may expeditiously be so conditioned that signals received over any signal originating path at a time when all other such paths are inactive, will automatically be formulated concurrently in each of two classes of fire house circuits; and so that, should there be concurrent signaling activity of two or more originating paths, the signal of the one of such paths having a predetermined relationship to the other path or paths concurrently active will be formulated in fire house circuits of one class, and the signal of the other or of a correspondingly predetermined other one of such concurrently active paths will be correspondingly formulated in the fire house circuits of the other class.

It is a further object of this invention to provide a multi-box-circuit fire alarm system comprising a central office of what may be termed "non-attended type," which system will be more simple and less expensive than prior systems having corresponding general characteristics.

It is a still further object of this invention to provide a multi-box-circuit fire alarm signaling system of what may be termed "a decentralized type," in which system each box circuit terminates at such one of several fire houses as is most economically accessible thereto, and facilities are provided for causing manifestation in all fire houses of calls from any circuit.

It is another object of this invention to provide a signaling system whereby so-called "emergency signals" received at any one of several police precinct stations will, automatically, be manifested at the associated police headquarters station and/or at other precinct stations.

Other objects and features of this invention will be apparent from the following detailed description which illustrates the genus of the invention by explaining several concrete embodiments thereof which are illustrated in the accompanying drawings, in which.

Figure 1:
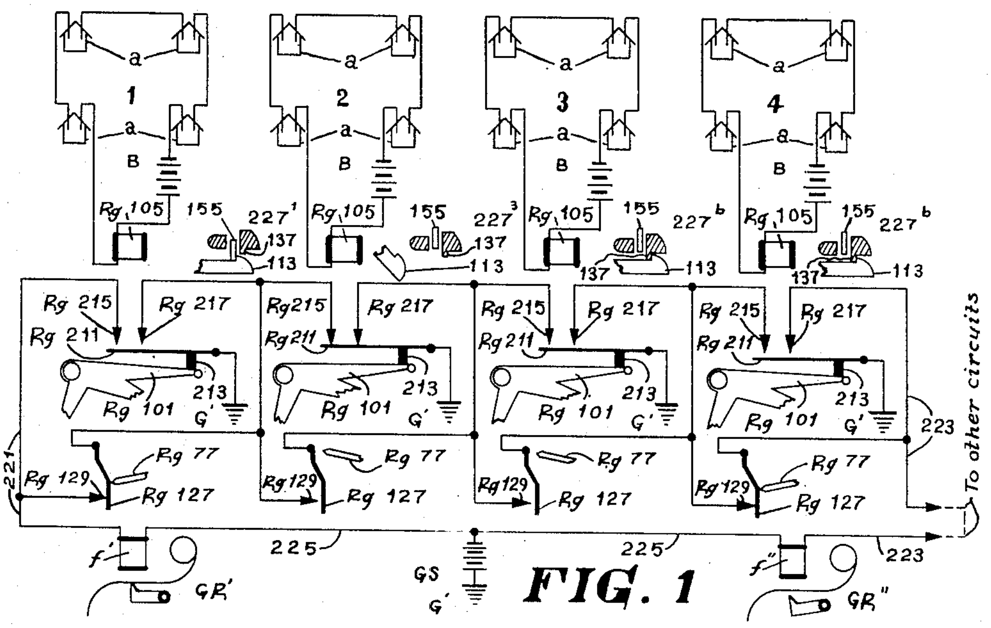
Fig. 1 is a schematic diagram of a signaling system embodying aspects of this invention in which normally deenergized current channels render manifesting equipment responsive, in common, to tape registers respectively governed by diverse code signal originating lines.

Throughout the various drawings, originating circuits are generally indicated by the numerals 1, 2, 3 and 4.

For convenience in description, similar equipment forming part of or associated with various circuits will be indicated by like reference letters. Where clearness of understanding will thereby be served such letters will be prefixed by the numeral representative of the associated originating circuit.

Code signal formulating stations serially connected in originating circuits are indicated by the letter *a* in connection with a symbol which is conventionally employed to represent municipal fire alarm boxes. In the interests of brevity of description and of convenience, these signal formulating stations will hereinafter be sometimes referred to as "boxes."

Mechanism for response to the signals of any one originating circuit or of two of any group of concurrently active originating circuits is suggestively indicated as comprising registering mechanism GR′ governed by the electromagnet *f′* and similar mechanism GR″ governed by the electromagnet *f″*.

In certain of the systems illustratively indicated by the drawings, the circuit arrangement is such that said magnets *f′* and *f″* are ordinarily energized and, in other of such systems, these magnets are ordinarily deenergized.

In representations of the mechanisms associated with said magnets *f′* and *f″*, where the circuit arrangement is such that these magnets are ordinarily deenergized, the association of the marking mechanism responsive thereto is diagrammatically indicated as being such that the marking action or what might be termed "the significant signaling occasion" occurs in response to energization of the controlling magnet. Where the circuit arrangement is such that these magnets are ordinarily energized, the significant signaling occasion occurs at the time of magnet deenergization.

For convenience in illustration and description, the tape registering mechanisms GR' and GR'' are suggestively indicated as if consisting of two separate instruments.

Although two completely independent recording instruments may be so utilized, convenience in use and avoidance of misreading of signals will be best served, for reasons which will be hereinafter more fully explained, by the use of registering mechanism which will produce side-by-side records on the same tape, from the mechanisms governed by the magnets f' and f''.

Such side-by-side record may be obtained by utilization of an instrument of any one of various well-known types; such, for example, as the two circuit register shown by Patent No. 1,664,933, dated April 3, 1928, to George E. King, for Signal instrument.

Recording mechanism such as that indicated by the King patent just referred to includes a member released for movement in one direction upon the occurrence of each signaling impulse, and thereafter slowly moved in the opposite direction for the purpose of ultimately stopping the paper feeding mechanism when no impulses have been received for a predetermined time. Many of those skilled in this art refer to such stopping mechanism members as "hoppers."

It is common practice in this art to associate contact mechanism with such hoppers, and said King patent discloses a manner of associating contact mechanism with a hopper of the type characteristic of said King register; however, the hopper member there shown is not of a form which lends itself to convenient fragmentary representation which is both simple and graphic. For this reason, the hoppers indicated in the annexed drawings are of the type indicated in Figs. 1 and 2 of Patent No. 1,920,237 dated August 1, 1935, to Beach et al., to which reference is had.

The arrangement disclosed in said Beach et al. patent is such that the associated contact will be actuated during the timing movement of the hopper and just prior to its arrival at the position where it serves as a detent for arresting the action of the paper feeding mechanism.

It should be understood that repeating mechanisms may be substituted for or used to supplement general registering mechanisms such as GR' and GR''; although, for the purpose of simplicity, such repeating mechanism is not indicated by all of the drawings.

*Detailed description of Fig. 1*

In addition to what has been thus far described as characteristic of embodiments of this invention which are shown in many or all of the drawings, the system of Fig. 1 comprises details as follows:

The code signal originating circuits 1, 2, 3 and 4, each includes a desired number of signal formulating "boxes" *a—a* (as hereinbefore more fully referred to) together with a current source or battery B and a line-register-controlling electromagnet R*g*105, for a line register which may be of any one of various well-known types.

For convenience in description and illustration, reference is made to the register of the aforesaid Beach et al. Patent No. 1,920,237, as being suited for utilization in an embodiment of this invention such as is shown in Fig. 1. Only those parts of the mechanism of such a register are here shown as are specially utilized in carrying out the present invention, and the reference numerals applied to such parts correspond with those identifying similar parts in said patent.

The register of said Beach et al. patent has a "control member or arm 101" which is governed by a "magnet 105" in a manner such that the arm is lifted incident to occurrence of "the significant portion of a signaling impulse" and is held lifted during a time which "corresponds very closely to the time required for the cycle of action of the punching train."

Figure 3:
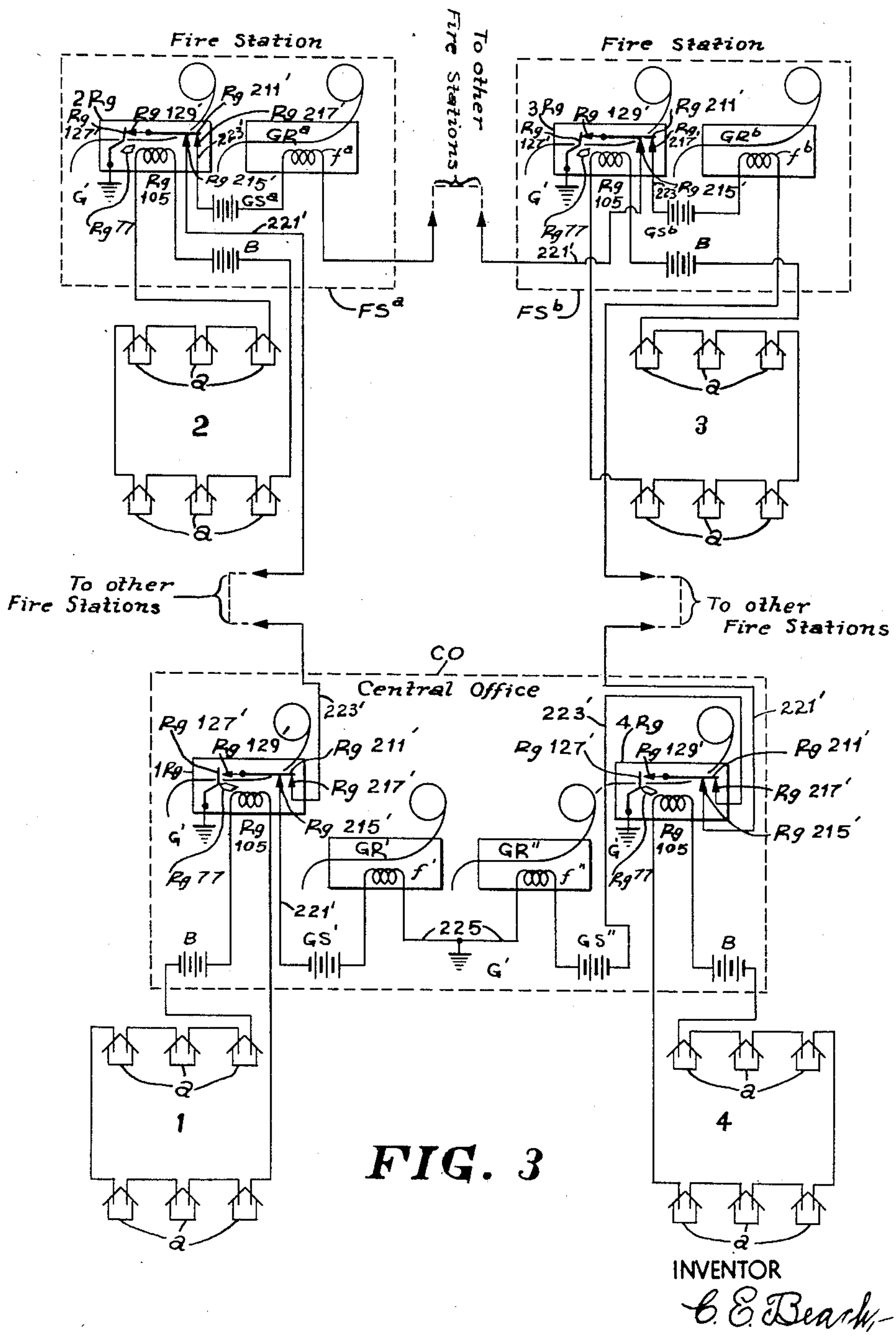
Fig. 3 is a schematic representation of a signaling system embodying aspects of this invention similar to those exemplified in Fig. 1, except in that the current channels are normally energized which render manifesting equipment responsive in common to tape registers representative of signal originating lines and such registers are situated both at a central station and at distant fire houses.
Figure 5:
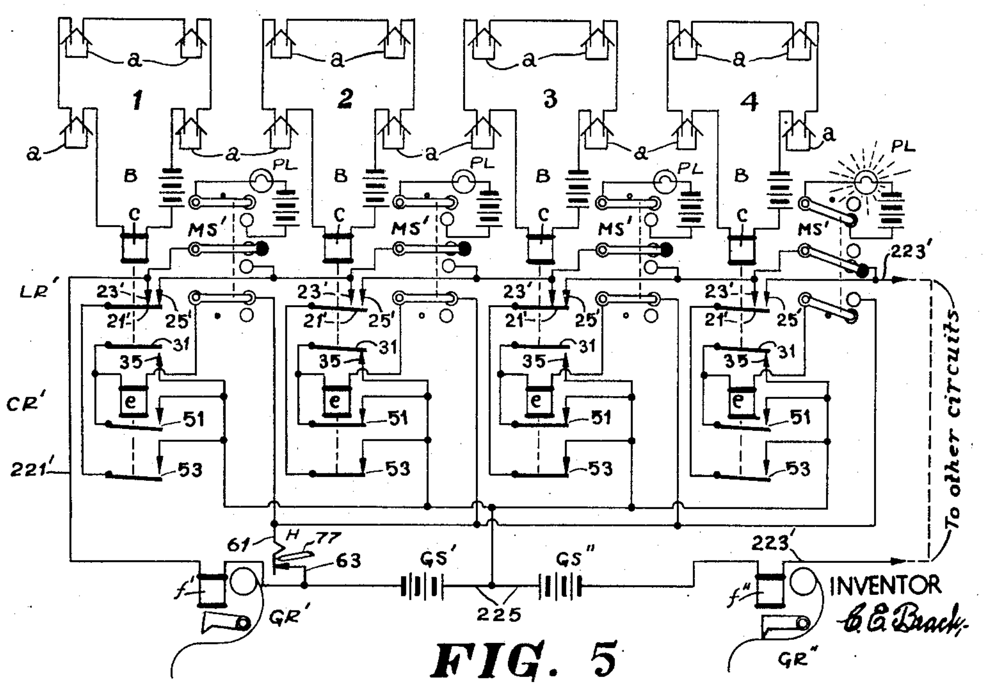
Fig. 5 is a diagram of a system similar to that of Fig. 4, except that the current channels for the general manifesting means are normally energized.

For a system such as that shown in the annexed Fig. 1, interruptions of the originating circuit are the significant portions of signaling impulses therein, hence the locking and trip mechanism of the line registers here indicated should be arranged in accordance with Figs. 1, 3 and 5 of the aforesaid Beach et al. patent, and the arms R*g*101 which are fragmentarily indicated in the annexed Fig. 1 will be lifted incident to each interruption of current flow in the associated originating circuit.

Each of the arms R*g*101 carries an insulating stud 213, for moving a flexible contact R*g*211 into engagement with both of the contacts R*g*215 and R*g*217.

A fragment of the free end of a feed detent or hopper arm R*g*77 is shown in association with a flexible contact R*g*127, whereby said contact is held against the contact R*g*129 only when said hopper arm is in or near its rest position. Said arm R*g*77 corresponds to the "arm 77" of said Beach et al. patent.

Each set of contacts R*g*215, R*g*217 is connected in parallel with the associated set of contacts R*g*127, R*g*129, so that either set may provide a current path short-circuiting the other set.

A current path generally characterized by the number 221 serially associates the sets of said contacts with one end the winding of the magnet f'; and a path generally characterized by the number 223 associates said sets with an end of the winding of the magnet f''. Such associations are in the order of circuit numbers, with the contacts of the lowest numbered circuit connected nearest the magnet f' and the highest numbered circuit nearest to f''.

The remaining ends of the windings of the magnets f' and f'' are connected to one terminal of the current source GS, and the other terminal of said source is connected to all of the flexible contacts R*g*211, as by ground connections G'.

In association with each originating circuit there is a representation of an operative stage of locking and tripping mechanism such as that of Figs. 1, 3 and 5 of said Beach et al. patent; the reference numbers applied to the various parts of such tripping mechanism here shown agreeing with those used in said patent.

The positionings of the various parts indicated in Fig. 1, are based upon assumptions as follows:

Circuit 1 is assumed to have remained closed for a time such that the hopper arm R*g*77 responsive thereto has reached its rest position. Because of the resultant energization of the associated magnet R*g*105, the tip 155 is in the path of and engaged by the latch 113. Hence, the recording mechanism governed by said latch is held at rest, and the hopper arm Rg77 presses the contact Rg127 against the contact Rg129.

Circuit 2 is assumed to have been interrupted so recently that the recording mechanism governed thereby has not proceeded in its cycle (resultant from withdrawal of the tip 155 from the path of the latch 113) beyond the stage of operation at which the hopper arm Rg77 withdraws its support from the contact Rg127; and said contact is therefore moved away from the contact Rg129.

Circuit 3 is assumed to have been interrupted at a time such that the associated recording mechanism has proceeded in its responsive cycle to a stage at which the latch 113 has engaged the catch bar 137, but at which the operation of the paper feed train has not continued for a time sufficient to cause the hopper arm Rg77 to move the contact Rg127 into engagement with contact Rg129.

Circuit 4 is assumed to have been deenergized for a time such that the paper feed train will have come to rest, and the contact Rg127 will therefore be held in engagement with the contact Rg129.

Inasmuch as the indicated operative stage for the tripping mechanisms of circuits 1 and 2 corresponds with those indicated in Figs. 1 and 3 of the aforesaid Beach et al. patent, such mechanisms are here indicated by the number 227 with exponents 1 and 3, respectively. Likewise, inasmuch as the indicated operative stage of the tripping mechanisms associated with circuits 3 and 4 corresponds with that indicated in Fig. 5*b* of the aforesaid Beach et al. patent, these mechanisms are here identified by the exponent *b*.

From the foregoing it will be apparent that when the registers are at rest and the originating circuits are closed, the various parts are positioned as indicated for circuit 1.

If, now, current flow is interrupted in one of the originating circuits, deenergization of the associated magnet Rg105 will result in withdrawal of the tip 155 from the path of latch 113, and the mechanism will cause arm Rg101 to be raised (in a manner more fully explained in said Beach et al. patent), thereby moving the contact Rg211 against contacts Rg215 and Rg217, and causing the hopper arm Rg77 to move out of the path of contact Rg127; which contact will thereupon move away from contact Rg129. The parts will then occupy positions as indicated in connection with circuit 2.

Assuming that, upon occasion of circuit register activity just described, the registers of the other circuits are at rest (so that their parts are positioned as indicated for circuit 1) when contact Rg211 of the active circuit touches its associated contacts Rg215 and Rg217, current flow from source GS will divide from Rg211, through contacts Rg215 and Rg217 and paths 221 and 223 associated therewith, to thereby effect energization of magnets *f'* and *f''* in parallel, with resultant actuation of the markers or other signal manifesting means associated with said magnets.

It will be apparent that energization of both magnets *f'* and *f''* is dependent upon continuity of the paths 221 and 223 leading from the contacts Rg215 and Rg217 of an active circuit.

If either of said paths is interrupted (as by separation of contacts Rg127 and Rg129 of a circuit at one side or the other of the active circuit) there will be no energization of the one of the magnets *f'* and *f''* which is dependent upon such interrupted current path. Assuming that the registers of circuit 1 and 4 are at rest (so that the contacts governed by these registers are positioned as indicated by the drawing) and that the contacts governed by the registers of circuits 2 and 3 are also positioned as shown, magnet *f'* will be energized and its marker actuated, because contacts Rg127 and Rg129 of circuit 1 are closed, but magnet *f''* will not be energized because contacts Rg127 and Rg129 of circuit 3 are open.

From the foregoing it will be apparent that signaling activity of any circuit register during inactivity of all of the other registers will be responded to by simultaneous action of the markers governed by magnets *f'* and *f''*.

In the event that signaling activity is initiated simultaneously by the registers of two circuits, the marker governed by magnet *f'* will fully and correctly show the signal of the register associated with the lower numbered one of the active circuits, and the marker governed by the magnet *f''* will correspondingly show the signal of the other register.

Thus assuming that circuits 2 and 3 of the system of Fig. 1 are concurrently active while the registers of circuits 1 and 4 are inactive, whenever the operation of the register of circuit 2 causes its contact Rg211 to be moved into engagement with its contact Rg215, a current path for energization of magnet *f'* is rendered effective from the ground terminal G' of battery GS to ground connection of contact Rg211 of the register of circuit 2; thence through said contact and through contact Rg215 associated therewith, through closed contacts Rg127 and Rg129 of the register of circuit 1, through the conductor 221, magnet *f'*, and through conductor 225 to the other terminal of said battery.

Correspondingly, whenever the register of circuit 3 causes its contact Rg211 to engage its contact Rg217, a current path for the energization of the magnet *f''* is rendered effective from the grounded terminal of the battery GS, through the ground connection G' to contact Rg211 of the register of circuit 3; thence through said contact and through the contact Rg217 associated therewith, through the closed contacts Rg129 and Rg77 of the register of circuit 4, through conductor 223, through magnet *f''*, and through conductor 225 to the other terminal of said battery.

Furthermore, under conditions such as just described, the marker governed by the magnet *f'* will not respond to closures of the contacts Rg211, Rg215 and Rg217 of the register of circuit 3, and the marker governed by the magnet *f''* will not respond to closures of the like contacts of the register of circuit 2.

Thus, under the assumed conditions, the current path for the magnet *f'* is open at the contacts Rg129 and Rg127 of the register of circuit 2 throughout activity of this register, so that closures of the contacts Rg211 and Rg215 of the register of circuit 3 cannot result in energization of the magnet *f'*; and the magnet *f''* is correspondingly rendered unresponsive to closures of the contacts of the register of circuit 2.

In the event that signal formulation starts simultaneously in three or more circuits, the marker governed by magnet *f'* will fully and completely respond to the signal of the register of the lowest numbered one of such circuits and the marker governed by magnet *f''* will respond to the register associated with the highest numbered one of the active circuits.

In the event of initiation of signaling activity of the register of any circuit after the commencement of signaling activity of the register of some other circuit, if the circuit of the subsequently starting register is of lower number than that of the previously starting register, magnet *f'* will thereafter respond to the subsequently starting register to the exclusion of the signal of the previously starting register. If the circuit of a subsequently starting register is numbered higher than that of the previously starting register, control of magnet *f''* will be correspondingly transferred.

Thus, assuming that the register of circuit 1 was to commence response to a signal while the registers of circuits 2, 3 and 4 remain at rest; and that, in the course of such response, the register of circuit 2 commences to respond to a signal, the action of the system of Fig. 1 would be as follows:

Upon commencement of the action of the register of circuit 1, withdrawal of support of its arm R*g*77 would permit its contact R*g*127 to move away from its contact R*g*129. Thereafter, whenever the contact R*g*211 of said register is moved into engagement with its contacts R*g*215 and R*g*217, energizing current paths for the magnets *f'* and *f''* will be established; so long as the registers of the other circuits remain inactive.

The current path established for energization of magnet *f'*, incident to each engagement of the contact R*g*215 by the contact R*g*211 is from the grounded terminal of the battery GS, through the ground connection G' to contact R*g*211 of the register of circuit 1; thence through said contact and through the contact R*g*215 associated therewith, through conductor 221, through magnet *f'*, and through conductor 225 to the other terminal of said battery.

The current path established for magnet *f''* incident to each engagement of the contact R*g*217 by the contact R*g*211 is from the grounded terminal of the battery GS, through the ground connection G' to contact R*g*211 of the register of circuit 1; thence through said contact and through the contact R*g*217 associated therewith, and, so long as the registers of circuits 2, 3 and 4 remain inactive, thence serially through closed contacts R*g*129 and R*g*127 of the registers of circuits 2, 3 and 4; to and through conductor 223, magnet *f''* and conductor 225 to the other terminal of said battery.

Upon commencement of activity of the register of a second circuit, the current path for magnet *f''* will no longer be responsive to the contacts R*g*211 and R*g*217 of the register of circuit 1; but said register will thereafter be responsive to the like contacts of the register of the subsequently starting circuit.

Thus, assuming that, after the register of circuit 1 has responded to one or more interruptions of its associated box circuit, the register of circuit 2 commences to act in response to a signal of its associated box circuit.

Upon the occasion of the initial action of the register of circuit 2, its contact R*g*127 would move away from its contact R*g*129, and the energization of the magnet *f''* would thereafter be dependent upon closures of the contacts R*g*211, R*g*217 of the register of circuit 2, so long as the registers of circuits 3 and 4 remain inactive.

Should the register of either circuit 3 or circuit 4 become active after any start of activity of the register of circuit 1 and/or circuit 2, there would be a corresponding transfer of the control of the magnet *f''*.

A suitable time after the conclusion of signaling activity of any register, its hopper member R*g*77 will cause closure between its contacts R*g*127 and R*g*129; whereupon the magnet *f'* or *f''* (as the case may be) may respond to the remainder of an uncompleted signal of another circuit previously in course of transmission.

For example, if the register of circuit 3 had responded to a portion of a signal while the registers of all other circuits were at rest, and the register of circuit 2 thereafter became active, the markers governed by both magnets *f'* and *f''* would have responded to the signal of the register of circuit 3 until commencement of activity of the register of circuit 2. Thereafter, the marker governed by the magnet *f'* would have responded to the register of circuit 2 throughout the activity of that register.

Thus, assuming that the registers of circuits 1 and 2 have been concurrently active, and that activity of the register of circuit 1 terminates prior to the end of the signaling activity of the register of circuit 2, the action of the system of Fig. 1 would be as follows:

When the register of circuit 1 has not responded to a signaling impulse for a time longer than the longest interval between the signaling impulses of any signal, its arm R*g*77 will move its contact R*g*127 into engagement with its contact R*g*129; thus establishing a current path from contact R*g*211 of the register of circuit 2, through the associated contact R*g*215 and thence through contacts R*g*127 and R*g*129 of the register of circuit 1, and through conductor 221 to the magnet *f'*. Whereupon, the general register GR' will respond to ensuing closures of the contacts R*g*211 and R*g*215 of the register of circuit 2.

From the foregoing, it will be evident that the marker governed by the magnet *f''* would show the complete signal of the register of circuit 3, and the marker governed by the magnet *f'* would show the complete signal of the register of circuit 2; the last named signal preceded by such portion of the signal of the register of circuit 3 as was formulated prior to the commencement of the signal of circuit 2.

If signaling activity of the register of circuit 2 had continued after contacts R*g*127, R*g*129 of the register of circuit 3 closed after the end of its signal, the marker governed by the magnet *f''* would have responded to such supplemental activity.

From the foregoing, it will be evident that concurrent activity of the registers of two or more circuits may result in fragmentary signal prefixes and/or suffixes, unless such activities start simultaneously and neither extends beyond the final closure of the contacts R*g*127, R*g*129 of the other.

For this reason, it is desirable that action upon signals governed by the magnets *f'* and *f''* be deferred until a given marker or other manifester has responded to two consecutive recordals of a given signal.

Occasion for so deferring response may be avoided, under certain circumstances, if the records of markers GR' and GR'' are applied side-by-side to the same tape (as hereinbefore recommended). If records are so applied, response may be made to a single recordal of any signal provided that the marks on the tape representative of all the impulses of the signal are situated exactly side-by-side.

Should some line fault cause an originating circuit to remain open indefinitely, the hopper arm Rg77 of the register of such circuit will act as a timing means to effect reclosure of the associated conditioning contacts Rg127, Rg129, at the expiration of a suitable time measured by the operation of the paper feeding train of such register. The parts will thereafter be positioned as indicated for circuit 4. Response of magnets $f'$ and $f''$ to other orginating circuits will thereafter be unaffected by such continued circuit interruption.

From the foregoing, it will be seen that the system of Fig. 1 provides for causing accurate manifestations of code signals of any originating circuit which is active during inactivity of the others grouped therewith, or like response of one and the other of said units to predetermined respective ones of concurrently active originating circuits.

It will also be observed that the units GR′ and GR″ need not embody the so-called "uniform pen" feature, as energization of the magnets $f'$ and $f''$ of said units is effected for uniformly brief durations, and a very simple form of pen register will therefore satisfactorily serve. In fact, it should be noted that the duration of circuit closures resultant from the actuations imparted to contact Rg211 by arm Rg101 in the system shown in Fig. 1, is limited to the time required for less than all of an operative cycle of the type of originating circuit register used. It is therefore important that manifesting equipment governed by the paths 221 and 223 shall be of a type which will dependably operate with a suitable factor of safety in response to closures of the character thus formulated.

Figure 2:
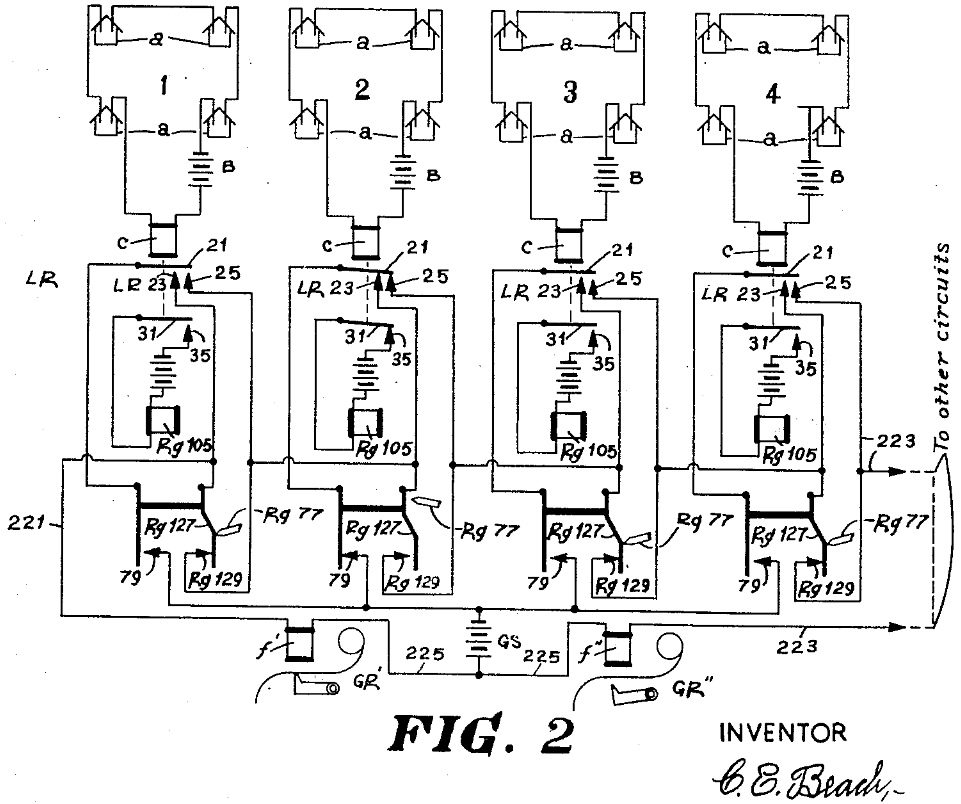
Fig. 2 is a diagram similar to Fig. 1 except in that relays are interposed between the originating lines and the line registers.

*Detailed description of Fig. 2*

In the event that closures limited to somewhat less than the operative cycle time of circuit registers is inadequate for assuring dependable operation of such manifesting equipment as is provided for response to paths 221 and 223, or if, for any other reason, it is desired that these paths shall be closed substantially throughout intervals when the originating circuits are open in the course of signal formulations, a line relay should be interposed between each originating circuit and its register, in a manner such as that shown in Fig. 2. The system here shown differs from that shown in Fig. 1 principally as follows:

Each of the originating circuits 1, 2, 3 and 4 includes the electromagnet $c$ of a line relay LR, in place of the electromagnet Rg105 correspondingly connected in the originating circuits of Fig. 1.

Each of said line relays LR comprises a movable contact 21 for simultaneously engaging the contacts 23 and 25 during deenergization of the magnet $c$; also a contact 31 correspondingly movable into engagement with the contact 35.

Each of the line registers comprises a governing electromagnet Rg105, the winding of which is energized by closure of the contacts 31, 35 incident to deenergization of the magnet $c$.

It will thus be apparent that the register magnet Rg105 will be energized resultant from interruption of current flow in the associated originating circuit; so that commencements of such energizations occur incident to the significant portions of signaling impulses (breaks) in the associated originating circuit. Consequently, the locking and tripping mechanism of these line registers should be arranged in accordance with Fig. 6 of the aforesaid Beach et al. patent.

In other words, these line registers should be of a type such that the marking action, and displacement of the hopper arm Rg77 will occur incident to energization of the magnet Rg105.

In addition to contacts Rg127 and Rg129 governed by the hopper arm Rg77 for short-circuiting the contacts 23 and 25 (as in the case of corresponding contacts of Fig. 1) the supplemental conditioning contacts 79 are arranged for operation incident to movements of the arm Rg77 so that when the shunting contacts Rg127 and Rg129 are closed, the conditioning contacts 79 will be open, and when said shunting contacts are open (as when the arm Rg77 is disengaged therefrom) the contacts 79 will be closed.

The contacts 79 are interposed between the relay contact 21 and the terminal of the current source GS to which similar contacts Rg211 are connected in accordance with Fig. 1.

Figure 6:
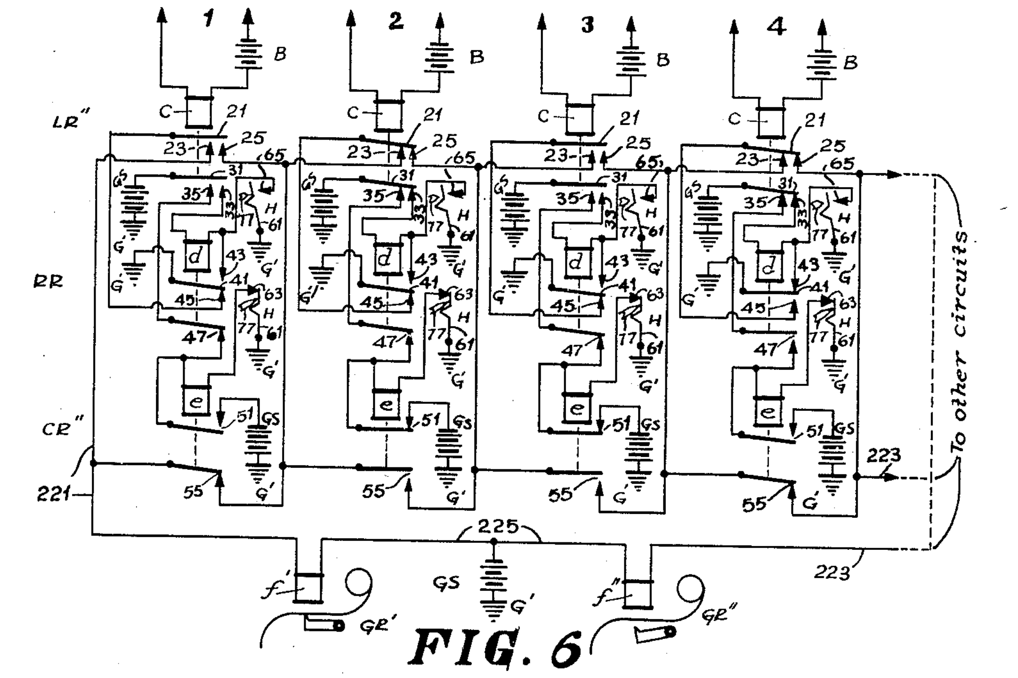
Fig. 6 is a diagram of a system similar to that of Fig. 4, except that automatically acting relays are substituted for manual cut-off switches.

Operative stages of the tripping mechanism are not here shown in association with respective originating circuits, as the positionings of such parts incident to the various circuit conditionings here indicated are shown in Fig. 6 of the aforesaid Beach et al. patent.

When the originating circuits are closed, and the registers are at rest, the parts associated with each of the various circuits are positioned as indicated for circuit 1.

Interruption of current flow in any originating circuit will then result in deenergization of its relay magnet $c$; and consequent movement of contact 21 into engagement with contacts 23 and 25, and movement of contact 31 into engagement with contact 35.

Closure of contact 21 with contacts 23 and 25 provides a shunt path around the contacts Rg127 and Rg129 and prepares a path for completion through contacts 79 with the otherwise free terminal of the current source GS.

Closure of the contacts 31, 35 establishes an energizing current path for magnet Rg105. This results in movement of the hopper arm Rg77 to a position permitting contact Rg127 to move away from contact Rg129, and permitting contacts 79 to close.

The parts will then occupy positions as indicated in connection with circuit 2; a connection being established through contacts 79 between contact 21 and a terminal of the current source GS.

Assuming that, when the parts are positioned as just described, the registers of the other circuits are at rest (so that their parts are conditioned as indicated for circuit 1) closure of contacts 79 will establish current flow from the source GS to contact 21 and thence through parallel current paths which will effect energization of the magnets $f'$ and $f''$.

From the foregoing, it will be evident that operation in response to the various originating circuits will correspond with that hereinbefore described in connection with Fig. 1, except energization of the magnets $f'$ and $f''$ will be substantially co-extensive with interruptions of current flow in any originating circuit throughout closures of the contacts 79 of the register associated with that circuit.

*Detailed description of Fig. 3*

The de-centralized fire alarm system of Fig. 3 resembles that shown in Fig. 1 as to its utilization of certain features of this invention, but differs therefrom principally as follows:

Signal manifesting equipment for response in common to all originating circuits is provided at each of various distant fire stations (such as the stations indicated by the dotted boundary lines $FS^a$ and $FS^b$), in addition to central office equipment which is indicated within the dotted boundary line CO, which corresponds with that shown in Fig. 1. The manifesting instruments at the central office CO have governing electromagnets $f'$ and $f''$, while those at the stations $FS^a$ and $FS^b$ have magnets $f^a$ and $f^b$.

Conductors inclusive of those providing current paths generally indicated at 221′ and 223′ serially connect said windings with contact sets Rg215′, Rg217′ and Rg127′, Rg129′ which are associated with various originating circuits.

With the arrangement of parts here shown, current flow is ordinarily maintained through the various current paths, and the source of current is sub-divided into sections GS′ and GS″ at the central office CO, supplemented by sections such as $GS^a$ and $GS^b$ at fire stations $FS^a$ and $FS^b$, respectively; and all of said source sections are serially connected in said paths together with the aforesaid magnet windings and contact sets.

The ground connection G′ is associated with the current path portion generally indicated at 225 in the central office CO. The path portion 221′, the current source section GS′ and the winding of the magnet $f'$ are situated in the circuit at one side of said connection G′, and the portion 223′, the current source section GS″ and the winding of magnet $f''$ are situated at the other side of said connection.

Each set of conditioning contacts Rg127, Rg129′ is so associated with its hopper arm Rg77 as to be open only when said arm is in or near its rest position. Said contacts Rg127′, Rg129′ are serially included in a current path which connects the associated contact Rg211′ with the ground connection G′; so that each contact Rg211′ will have what may be termed "an intermediate current source potential" applied thereto throughout closure of the associated conditioning contacts Rg127′, Rg129′.

Operation in response to the various originating circuits generally corresponds with that hereinbefore described in connection with Figs. 1 and 2, except that, in the event of concurrent formulation of code signals in two or more originating circuits, when a general responsive unit at an outlying fire station has initially responded to signaling activity of originating circuit registers electrically at respective sides thereof, the magnet of such unit will be subject to energization in the event that both of such circuit registers act for some stroke at substantially the same time.

For example, in the event of signal formulation in circuit 1, in the course of which signal formulation starts in circuit 4, general registers $GR^a$ and $GR^b$ will respond to each action of the line register Rg of circuit 1 until the initial action of the line register of circuit 4. Thereafter, the magnets of registers $GR^a$ and $GR^b$ will remain deenergized, other than in the possible event of simultaneous closures of the contacts Rg211′, Rg215′, Rg217′ of the line registers of both circuits 1 and 4.

Upon the occasion of any such simultaneous closure, a current path will be provided for energization of the magnets $f^a$ and $f^b$, which current path will comprise the ground G′ of the register 1Rg, contacts Rg127′, Rg129′, Rg211′, and Rg217′ of said register; contacts Rg215′, Rg211′, Rg217′ of register 2Rg, battery $GS^a$, magnet $f^a$; contacts Rg215′, Rg211′, Rg217′ of register 3Rg, battery $GS^b$, magnet $f^b$; and contacts Rg215′, Rg211′, Rg129′, Rg127′ and ground connection G′ of line register 4Rg.

From the foregoing it will be evident that such general register activity at intermediate stations as may result from simultaneous action of line registers electrically situated at respective sides thereof will be so infrequent, if occurring at all, during any occasion of signaling activity, as to avoid possibility of resultant confusion; also, that, in any event, units GR′ and GR″ at the central office will respond to the signals of the lowest and highest numbered active circuits, respectively; and no signals will be lost, as each originating circuit has its register Rg for manifesting signals formulated therein at one of the fire houses or at the central office, as the case may be.

In the use of systems such as those of Figs. 1, 2 and 3, dependability of operation requires that actuating force for registers of originating circuits, such as the registers Rg shall be at all times adequate for signal response.

Systems such as those of Figs. 1 and 3 obviously depend upon the operation of the individual line registers for accomplishment of the stroke-by-stroke response of the general instruments. Even systems such as that of Fig. 2, require closure of the conditioning contacts 79 at the commencement of any signal, and systems of Figs. 1, 2 and 3 need the restoration action of the conditioning contacts Rg127, Rg129 to restore the circuit for the general instruments following the completion of a signal.

In this connection, it should be noted that registers of types most likely to be used as the line regiters Rg are so constructed that inadequate winding of the actuating or "main" springs thereof usually results in stalling of operation in the midst of marking action, so that the arm 77 will not be actuated to a position where it will restore the conditioning contacts 79, Rg127, Rg129. Thus, if two originating circuit registers stalled because of insufficient winding, such stalling will render the general instruments unresponsive to registers situated in the general circuit between the two stalled registers. In an extreme case, this might result in rendering the general instruments unresponsive to all of the originating circuits; as would happen if the registers for the highest and lowest numbered circuits were both stalled, with their contacts 79 closed and their contacts Rg127, Rg129 open.

Figure 4:
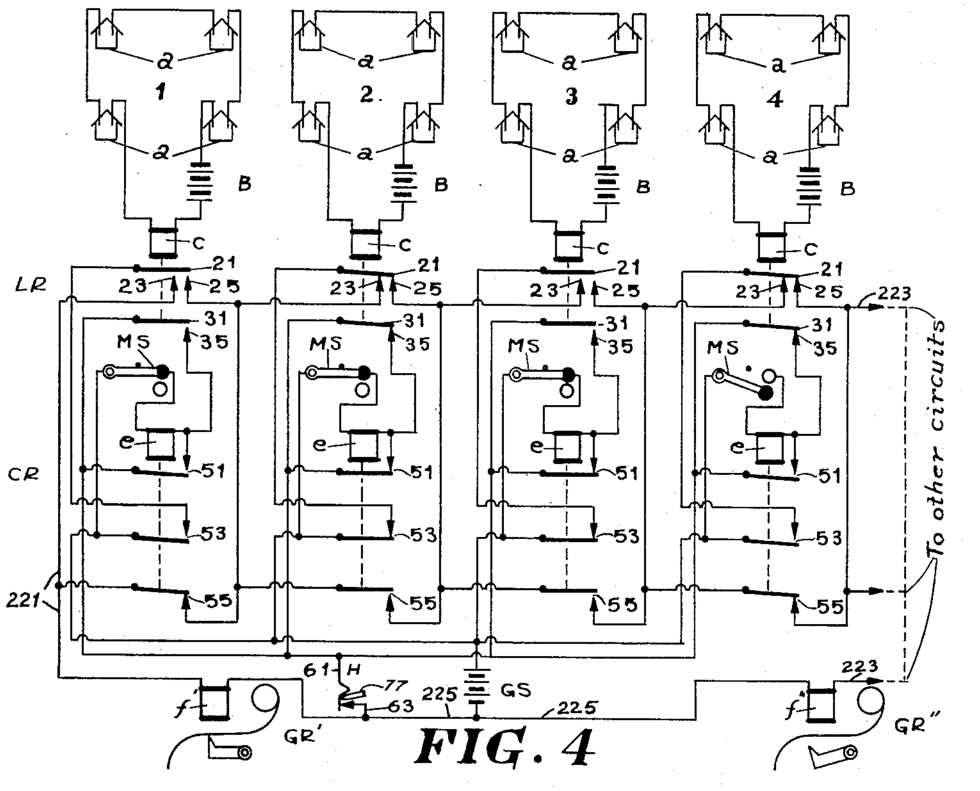
Fig. 4 is a diagram of a signaling system embodying aspects of this invention in which relays respectively governed by code signal originating lines act through normally deenergized current channels to cause response of general manifesting means, with manual cut-off switches for faulty lines.

*Detailed description of Fig. 4*

In applying this invention to systems the operating conditions of which are such that it is deemed inexpedient to rely upon timely rewinding of originating circuit registers, as well as in the event that available registers are not equipped with conditioning contacts such as 79, Rg127, Rg129; or if, for any other reason, reliance upon originating circuit registers is not desired, the system shown by Fig. 4 may be advantageously utilized. This system differs from those shown in Figs. 1, 2 and 3, principally, in respects as follows:

In association with each line relay LR, there is a conditioning relay CR having an electromagnet $e$ and contacts 51 and 53 which are closed responsive to energization of said magnet $e$, and contacts 55 which are closed resultant from deenergization of said magnet.

An assembly of a hopper arm fragmentarily indicated at 77 with timing contacts 61 and 63 is generally indicated at H. Said arm 77 forms part of the starting and stopping mechanism for the paper feed of general responsive mechanism GR', GR'', as hereinbefore more fully explained. Said contact 61 forms a tongue which normally engages said contact 63, and is subject to temporary displacement therefrom by said hopper arm 77, just before said arm acts to arrest the operation of the paper feeding mechanism of said general responsive mechanism GR', GR''.

The contacts 21, 23, 25, of each of the line relays correspond with like contacts of the line relays of the system of Fig. 2. Contacts 31, 35, of said line relays govern a current path for energizing the magnet *e* of the associated conditioning relay CR, and lock-up paths for such relays are provided by the contacts 51. The contacts 53 and 55 govern conditioning paths corresponding to the paths governed by the contacts 79, and the contacts Rg127, Rg129, respectively, of the register Rg of Fig. 2.

A manual switch MS in the current path of the winding of the magnet *e*, is for the purpose of, at times, rendering the current paths for the magnets *f'*, *f''* unaffected by respectively associated originating circuits. When the paper feed for the general responsive mechanism GR', GR'' is at rest, the parts of relays LR and CR of closed originating circuits are positioned as indicated for circuit 1.

Interruption of current flow in any originating circuit results in deenergization of its associated line relay magnet *c* with consequent closing of its contacts 21, 23, 25 and of its contacts 31, 35.

Closing of contacts 31, 35, causes energization of magnet *e*, with consequent closing of lock-up contacts 51 and conditioning contacts 53; and opening of conditioning contacts 55; as indicated for circuit 2.

Assuming that the magnets *e* of the conditioning relays of other circuits are not energized, a current path is thus established from the battery GS, through contacts 53 to contact 21, where the current flow will divide, one part passing through contact 23 and magnet *f'*, and the other part through contact 25 and magnet *f''*, to the other terminal of the battery GS, with resultant actuation of the markers or other signal manifesting means associated with said magnets.

When an originating circuit is closed, following a break incident to signal formulation, the contacts of the relays LR and CR assume the positionings indicated for circuit 3; the contacts 21, 23, 25 and the contacts 31, 35 being open, and energization of the magnet *e* is maintained (notwithstanding the separation of contacts 31, 35) because of closure of the lock-up contacts 51; and the current path through the magnets *f'*, *f''* is interrupted because the path through contacts 55 is now open, in addition to the opening of the path through contacts 21, 23, 25.

After the conclusion of signal formulation, a time will elapse during which the markers or other signal manifesting means associated with the magnets *f'* and *f''* will remain inactive, which time is longer than the longest occasion of such inactivity within any signal. At the conclusion of such time, the arm 77 will temporarily displace the tongue 61 from the contact 63.

Such displacement of said tongue 61 will result in cutting off current flow from such of the magnets *e* as are then energized, so that the contacts of any and all controlling relays CR of any previously active circuit or circuits will return to the positionings indicated in connection with circuit 1.

In the event signaling activity is initiated simultaneously in two originating circuits the response of the general mechanism GR' GR'' will be substantially the same as hereinbefore described for the system of Fig. 1, except that fragmentary signal suffixes, such as may occur in the use of the systems of Figs. 1, 2 and 3, will not result from like circumstances in the use of the system of Fig. 4.

Thus, for example, following concurrent signaling activity of circuits 2 and 3, there will be continued energization of the magnets *e* of the conditioning relays of both of said circuits so long as there is continued activity of the mechanism controlled either by magnet *f'* or by magnet *f''*. Thus, assuming that formulation of a signal in circuit 3 proceeds after circuit 2 has finally closed following completion of its signal, (contacts 21, 23, 25, being then open) such continued energization of the magnet *e* of circuit 2 will cause the associated contacts 55 to remain open and thereby prevent magnet *f'* being affected by signaling impulses in circuit 3.

Should an originating circuit remain open indefinitely, the hopper arm 77 will, after a suitable delay, move contact 61 away from contact 63 (the relay contacts having first been positioned as indicated for circuit 2). Notwithstanding continued closure of contacts 31, 35, and of contacts 51, such opening of said hopper contacts will cause deenergization of the magnet *e*, and consequent opening of the conditioning contacts 53 and closure of contacts 55.

Such opening of contacts 53 will result in deenergization of magnets *f'* and *f''*; and reclosure of said hopper contacts immediately thereafter will cause reenergization of the magnet *e* (contacts 31, 35 remaining closed because of continued deenergization of magnet *c*); the resultant closure of contacts 53 causing reenergization of said magnets. Such deenergization and reenergization of magnets *f'* and *f''* constitutes a signaling stroke cycle for the mechanism GR', GR'', causing the hopper arm 77 to be transferred from its locking position and, after a suitable delay to act again momentarily to separate contact 61 from contact 63.

It will thus be seen that the mechanism governed by the magnets *f'*, *f''* would continue to act at the conclusion of each of the operative cycles of the arm 77, so long as conditions remain unchanged.

To terminate such action, the manual switch MS may be moved to break the current path through the magnet *e* of the conditioning relay CR of the faulty circuit; thus effecting the conditioning indicated in connection with circuit 4. While this switch is thus positioned, the current paths for the magnets *f'*, *f''* are unaffected by such faulty originating circuit.

*Detailed description of Fig. 5*

If conditions are such that it is desirable that the current path for the magnets *f'* and *f''* be normally closed (as in the instance of Fig. 3) instead of being normally open (as in the instances of Figs. 1, 2 and 4) certain features of this invention may be utilized in the manner indicated in Fig. 5; which differs from Fig. 4, principally, in respects as follows:

Each line relay LR' has a repeating contact 21' movable responsive to energization of its magnet *c* into engagement with the repeating contacts 23', 25', and the conditioning relay CR' lacks the contacts 55 provided in the relay CR of Fig. 4.

The situation of current source sections GS' and GS'' corresponds, substantially, with the situation of like sections in Fig. 3; and wiring connections are substituted for the ground connections G' of Fig. 3.

The manual switch MS' comprises three arms linked for simultaneous movement. The upper one of these arms controls a current path for the pilot lamp PL; the center arm governs a shunt path around the repeating contacts 23', 25' (corresponding to the path governed by contacts 55 of Fig. 4), and the lower arm governs the current path for the magnet *e* of the conditioning relay CR'.

The arrangement of the contacts of each switch MS' is such that, when in normal (upper) position, the lamp PL is extinguished, the shunt around the repeating contacts 23', 25', is open, and the current path for magnet *e* is closed.

When any one of said switches MS' is in its emergency or abnormal position, warning of that fact is given by lighting of the pilot lamp PL (as indicated in the case of the switch associated with circuit 4) the repeating contacts 23', 25' are short-circuited; and the current path for the magnet *e* is open, so that the conditioning relay will not respond to the line relay, and so that the current path for the magnets *f'*, *f''* will be unaffected by the line relay LR' of the associated circuit.

When the originating paths 1, 2, 3 and 4 are closed, the magnets *e* of their conditioning relays CR' are deenergized, and their manual switches MS' are normally positioned, interruption of current flow in any originating circuit will result in deenergization of its associated line relay magnet *c* with consequent opening of its repeating contacts 21', 23', 25', and closing of its contacts 31, 35.

Opening of contacts 21, 23', 25' will cause deenergization of magnets *f'*, *f''* and significant signaling activity of the markers or other signal manifesting means associated with said magnets.

Closing of contacts 31, 35 causes energization of magnet *e*, with consequent closing of lock-up contacts 51, and conditioning contacts 53, as indicated for circuit 2.

When an originating circuit is closed, following a break incident to signal formulation, the contacts of relays LR' and CR' assume the positionings indicated for circuit 3; the current path through the magnets *f'*, *f''* being closed, and a connection being established from the conductor 225 (which is intermediate the current sources GS', GS'') through contacts 53 and 21', to contacts 23' and 25', so that either magnet *f'* or *f''* can be energized notwithstanding interruption of the current path to the other.

In general, the functional results of the system of Fig. 5 correspond substantially with those of Fig. 4, although such results are not in all instances obtained in exactly the same manner. For example, when the magnets *e* of the conditioning relays of both of two previously active circuits remain energized after one of such circuits has finally closed following completion of its signal, continued energization of such magnet *e* will result in application of what has been hereinbefore referred to as "an intermediate current source potential" from the conductor 225 through the contacts 53 of the conditioning relay and the contacts 21' and 23' or 25' of the line relay.

Thus, if there is concurrent signaling activity of circuits 2 and 3 (as was assumed in the example described in connection with Fig. 4) and the formation of the signal in circuit 3 continues after circuit 2 has finally closed following completion of its signal, continued energization of the relay magnet *e* associated with circuit 2 will cause the contacts 53 of said relay to remain closed, thus maintaining energization of magnet *f'* through said contacts 53 and through contacts 21 and 23' of line relay LR', with the result that signaling impulses from circuit 3 will not affect magnet *f'*.

Continued interruption of an originating circuit, while its manual switch MS' is normally positioned, will result in interruptions of current supply through the magnets *f'*, *f''* upon each occasion that the arm 77 separates the contact 61 from the contact 63; as more fully explained in connection with Fig. 4.

When such action is terminated by abnormal positioning of the switch MS', the associated pilot lamp PL will be lighted, the contacts 23', 25' of the associated line relay LR' will be short-circuited, and the current path for the magnet *e* of the conditioning relay CR' of the associated circuit will be interrupted, with resultant opening of contacts 53; thus leaving the magnets *f'*, *f''* as fully responsive to other originating circuits as if such faulty circuit and its associated manual switch were normally conditioned.

*Detailed description of Fig. 6*

The operating conditions of many fire alarm system render it inexpedient that it should be necessary for an operator to manipulate switches in order to prevent loss of signals on a busy occasion.

For example, during an extensive fire, one or more originating circuits may be interrupted by the fire itself at a time when the operator should be handling calls for additional equipment.

The embodiment of this inventnon shown in Fig. 6 provides means for automatically accomplishing results such as those provided by the manual switches MS of Fig. 4 and MS' of Fig. 5, through provision of an additional relay in association with each originating circuit. For convenience, such relays will be hereinafter referred to as "restoring relays."

Each restoring relay RR comprises an electromagnet *d*, a contact 41 movable responsive to energization of magnet *d* into engagement with contact 43, and into engagement with contact 45 during deenerization of said magnet. Said relay also has the contacts 47 which are opened responsive to energization of said magnet.

The hopper contact mechanism H is, for convenience, repeatedly represented, two aspects of this hopper mechanism being shown in association with each originating circuit.

The tongue 61 normally rests against the contact 63 (as in the embodiments indicated in Figs. 4 and 5) and, as the arm 77 approaches its stopping position, it first moves said tongue away from said contact 63 and against contact 65, and finally permits said tongue to return from contact 65 into engagement with contact 63.

In addition to repeated representations of the hopper contact assembly H, there are repeated representations of the current source GS in association with the various originating circuits. It should be recognized, however, that a single current source GS will answer all purposes, and that such source can be applied by wiring methods corresponding to those indicated in Figs. 4 and 5.

Each of the line relays LR'' is provided with a governing magnet *c*, and with repeating contacts 21, 23 and 25 which are closed during deenergization of said magnet *c*, as in the instance of the relay LR of the system of Fig. 4.

The contact 31 of each relay LR'' is movable into engagement with the contacts 33 and 35 incident to deenergization of magnet *c*.

The conditioning relays CR'' are similar to the relays CR of Fig. 4 in that they are equipped with lock-up contacts 51, and conditioning contacts 55 for shunting the repeating contacts 23, 25; but differ in that they do not require the conditioning contacts 53 of said Fig. 4.

Operation of the system of Fig. 6, under ordinary circumstances, so nearly resembles that of the system of Fig. 4 that it should be readily understood by those skilled in this art, without repetition of a description thereof at this place.

In the event of interruption of an originating circuit for a time longer than circuit interruptions incident to signal formulation, the hopper arm 77 will move its associated tongue 61 away from contact 63 and into engagement with contact 65.

Upon separation of said contact 61 from contact 63, the magnet *e* of the conditioning relay CR'' of the faulty circuit will be deenergized and its locking contacts 51 will open.

When contact 61 engages contact 65, a current path is established from battery GS through contacts 31 and 33 (magnet *c* being deenergized) with resultant energization of magnet *d* and movement of contact 41 away from contact 45 and against contact 43, and contacts 47 will be open.

Separation of contact 41 from contact 45 interrupts the previously existing connection between the intermediate current source potential (as previously existing between conductor 225 and grounds G' associated with contacts 41, 45) and repeating contact 21.

Engagement of contact 43 by contact 41 establishes a lock-up path for magnet *d*, through contacts 31, 33, said magnet and contacts 43 and 41.

Separation of contacts 47 assures continued deenergization of magnet *e*, notwithstanding continued connection between contacts 31 and 35; the various parts then occupying positions as indicated in connection with circuit 4.

It will be noted that relays such as LR'' are required to effect dependable closures of at least two sets of double contacts incident to each deenergization of magnet *c*.

Although satisfactory operating results can be obtained in the use of relays requiring closures of such multiple contacts incident to magnet deenergizations provided that both circuit capacitance and speed of signaling are suitably limited, as capacitance increases with long circuits and high speed signaling demands practically instantaneous response to very short circuit interruptions, it will be found necessary to utilize highly sensitive relays requiring skillful adjustment at frequent intervals.

Figure 7:
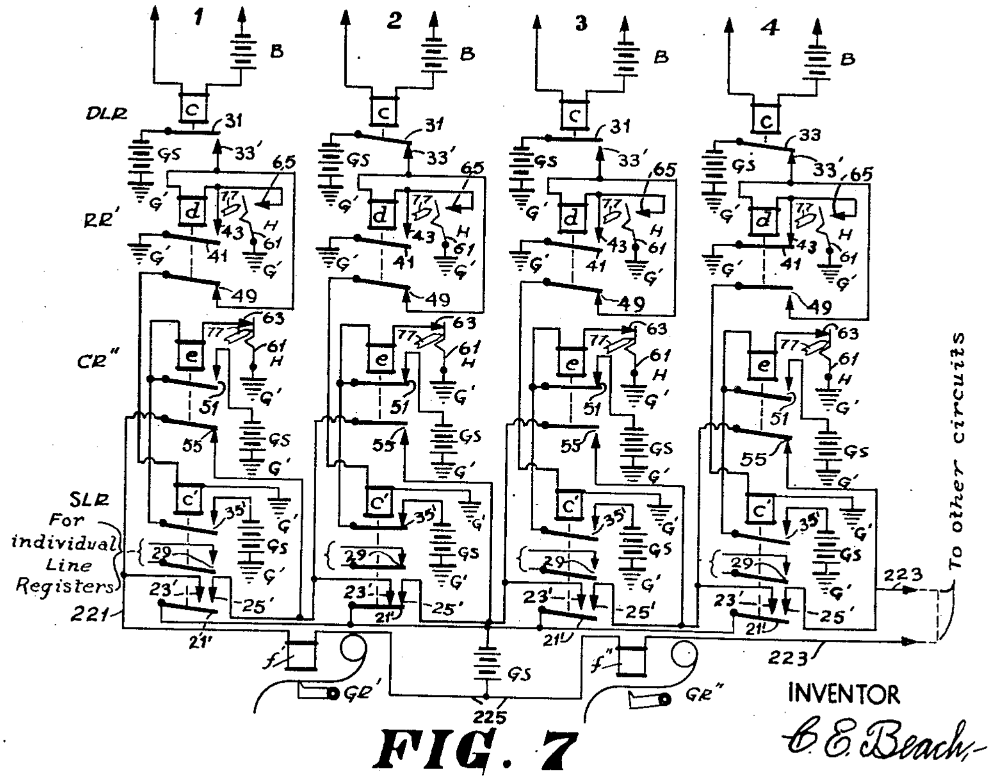
Fig. 7 is a diagram of a signaling system similar to that of Fig. 6, with the addition of supplemental line relays.

*Detailed description of Fig. 7*

For systems operating at comparatively high speed and/or having originating circuits of high capacitance, or which, for any other reason need highly sensitive main line relays, the embodiment of this invention shown in Fig. 7 will be found particularly advantageous.

The system here shown differs from that of Fig. 6 principally in that the functions of the line relay LR'' of Fig. 6 are mostly transferred to the supplemental line relay SLR, and the relays DLR directly connected in the originating circuits merely control a single set of make and break contacts 31, 33'; other changes being merely those rendered expedient incidental to transfer of functions to the supplemental line relays SLR.

Each direct line relay DLR comprises a governing magnet *c* responsive to the associated originating circuit, a movable contact 31 governed by said magnet and a stationary contact 33' which is engaged by said contact 31 incident to deenergization of magnet *c*.

Each restoring relay RR' has lock-up contacts 41, 43 and has governing contacts 49 for a current path from contact 33' of relay DLR to magnet *c'* of relay SLR.

It will be noted that although the current paths to magnets *c'* and *d* are both governed by contacts 31, 33' of direct line relay DLR, the path to magnet *d* is ordinarily open at the hopper contacts 61, 65 when the magnet *c'* is responding to signal formulations. This is important, in that there would be a tendency toward objectionable impairment of the dependability of responses of the relay SLR were the magnet *d* ordinarily energized and deenergized in parallel therewith.

The structural and functional characteristics of the controlling relay CR'' are substantially like those of the corresponding relay of Fig. 6.

The contacts 35' of the supplemental line relay SLR perform the function of the contact 35 in association with the contact 31 of the line relay LR'' of Fig. 6, these contacts closing incidental to energization of the magnet *c'* (instead of opening as in the instance of the line relay of Fig. 6) because the magnet *c'* is energized incident to originating circuit interruptions which cause deenergization of the magnet *c*.

The contacts 23', 25', serve with the movable contact 21' to correspondingly accomplish the purposes of the contacts 21, 23, 25 of Fig. 6.

It will be understood by those skilled in this art that line relays, such as the relays LR, LR', LR'', of Figs. 2, 4, 5 and 6 would, ordinarily, be equipped with contacts for governing individual circuit markers, in addition to the contacts shown. Inasmuch as individual circuit registering means forms no part of the embodiments of this invention shown by the drawings just referred to, such supplemental contacts have been omitted therefrom. However, it will be understood by those skilled in this art that such contacts may be taken for granted, and that their presence would provide additional contact loadings for the relays referred to.

In the instance of the system of Fig. 7, however, contacts 29 representative of such individual circuit markers are shown in association with each of the supplemental line relays SLR. The advantage of transferring such contacts from direct line relays to these supplemental relays will be obvious, in that clean cut energizations and deenergizations of the magnets *c'* of these relays SLR will result from the response of the sensitive direct line relays DLR.

The operation of the system of Fig. 7 so closely parallels that of the system of Fig. 6 that repetition of a description thereof at this place is deemed unnecessary.

Figure 8:
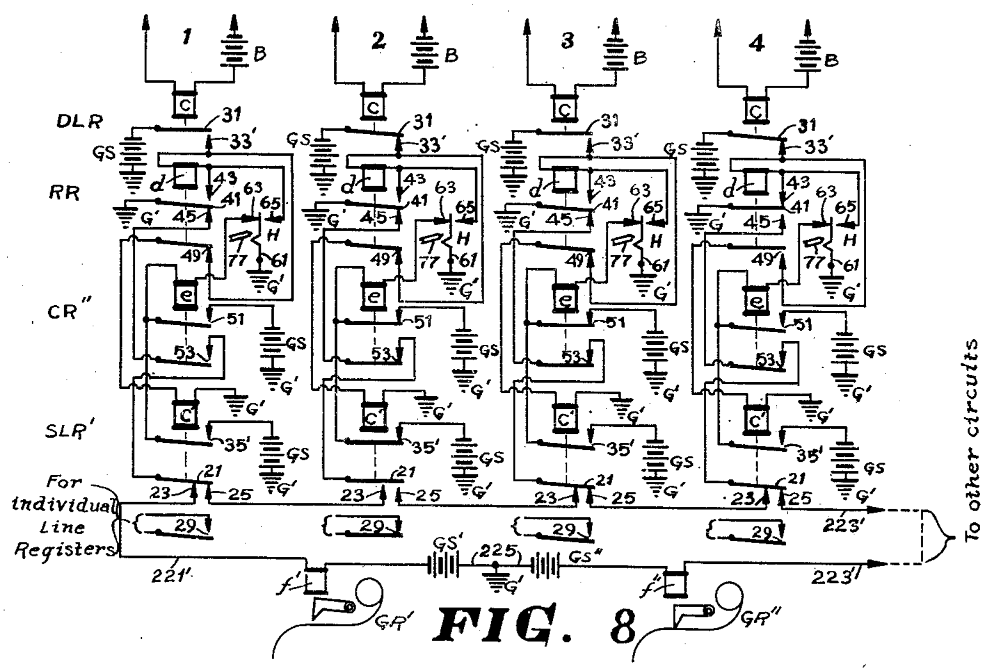
Fig. 8 is a diagram of a signaling system similar to that of Fig. 7 except that the current channels for the general manifesting means are normally energized.

*Detailed description of Fig. 8*

The system of Fig. 8 differs from that of Fig. 7 principally in that the current source for the paths 221', 223' which control the general responsive mechanism GR', GR'', is divided in the sections GS', GS'', and a ground connection G' is applied to the conductor 225 for affording an intermediate current source potential, thus generally corresponding as to these features with the arrangements shown in Figs. 3 and 5; there being incidental revisions of current paths and contact arrangements of the various relays.

It is believed that the nature and purposes of such changes will be readily apparent to those skilled in this art, in view of the foregoing descriptions of other embodiments of this invention, without further recital of them at this place.

Figure 9:
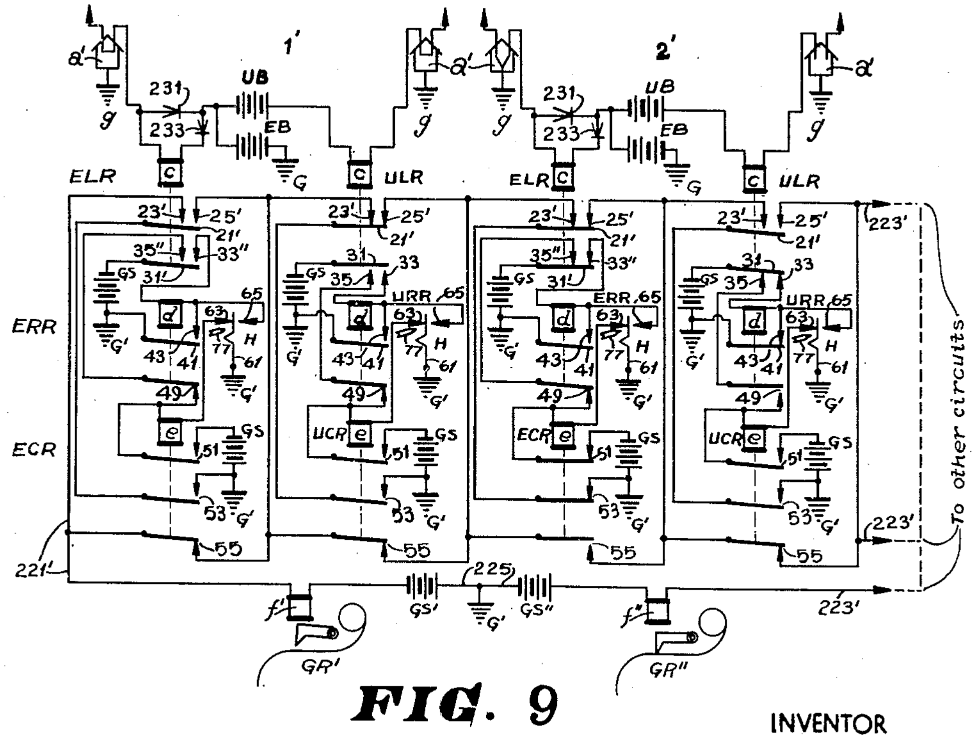
Fig. 9 is a diagram of a modification of the system of Fig. 6 in which certain originating line current paths are normally closed and other of such paths are normally open.

*Detailed description of Fig. 9*

The embodiment of this invention shown in Fig. 9 is suited for signaling systems in which normally closed originating circuits have respectively associated emergency return paths such as indicated in Fig. 1 of my Patent No. 2,034,017, of March 17, 1936.

In the system of my said patent, an emergency path is utilized in the event that the usual series circuit develops a faulty condition, such, for example, as when the usual series path has been accidentally ruptured or when there is a short circuit around one or more of the originating stations or boxes.

The originating circuits 1' and 2' here shown each has an emergency current source or battery EB connected between one terminal of the normal current path battery UB and the ground connection G; and each of the boxes *a'* has a ground connection to be rendered effective during signal formulation activity of such box either subject to control of a so-called "non-interference magnet" or (in the instances of some signaling systems) throughout all signal formulating activity. Various types of signal formulating stations utilizing such emergency ground return paths are well known to those skilled in this art. The detailed construction of the mechanisms of such boxes is therefore not shown by the drawings and will not be herein described in detail.

The line relays ULR responsive to the usual normally closed or all metallic paths of the originating circuits are substantially the same in structure and function as the line relays LR'' of Fig. 6, except in that the contacts 21', 23', 25', of Fig. 9 are closed incident to energization of magnet *c*, while corresponding contacts of relays LR'' of Fig. 6 are opened incident to such energization. This change is necessitated because the common responsive mechanism current paths 221', 223' of Fig. 9 are normally energized, and should therefore be deenergized responsive to interruptions of the current path through magnet *c* of Fig. 9, while the common current path of Fig. 6 is normally open, and should therefore be closed incident to interruptions of the originating circuit.

The emergency path line relays ELR are so connected to their associated originating circuits as to be energized only when there is current flow from the source EB through a path which does not include the source UB; these results being obtained by the use of the rectifiers 231, 233 in a manner more fully explained in said Beach Patent No. 2,034,017.

The restoring relays URR and the conditioning relays UCR associated with the usual path line relays ULR are similar to corresponding restoring relays RR' and conditioning relays CR'' of Fig. 7, respectively.

The emergency path line relays ELR differ from the usual path line relays ULR in that the contacts 31', 33'', 35'' are positioned for closure in response to energization of the associated magnet *c*; taking the place of the contacts 31, 33, 35 of the usual path line relays ULR. This change is made because the magnet *c* of this relay is normally deenergized and its movable contacts 21', 31' are therefore ordinarily in retracted positionings, as shown, while the corresponding contacts of relays ULR are normally in attracted positionings.

The restoring relays ERR and the conditioning relays ECR associated with the emergency path line relays ELR correspond with the relays URR and UCR, respectively.

Magnets *f'*, *f''* are here ordinarily energized, the current source therefor being subdivided into sections GS' and GS'', and the mechanism GR', GR'' gives significant response to deenergizations of said magnets, as in the cases of the systems of Figs. 3 and 8.

It will be noted that, in the instance of each usual-line relay ULR, deenergization of its associated magnet *c* results in closure of its contacts 31, 33, 35; while corresponding contacts of the emergency-line relays ELR close responsive to energization of their associated magnets. Because of such relative positionings of contacts and of the fact that the magnets of the relays ULR are ordinarily energized, while the reverse is true of the magnets of relays ELR, there is no current flow through the windings of the magnets *d* and *e* of any of the restoring or conditioning relays other than during signal formulation or during faulty conditioning of a usual or emergency path of an originating circuit.

Operation of the system of Fig. 9 incident to formulation of signals in the usual current path of any originating circuit or circuits corresponds substantially with that hereinbefore described in connection with Fig. 4 as modified in connection with Fig. 6.

Operation in response to signal formulation in the emergency path of any circuit differs from a usual path signal, principally, in that energization of the magnet *c* of an emergency path line relay ELR causes closing of its contacts 31', 33'', 35''. Incidental closure of its contacts 21', 23', 25' establishes a current path around conditioning contacts 55 of the associated conditioning relay ECR.

Closure of contacts 31', 33'' prepares a path for energization of the magnet *d* of restoring relay ERR, which path (if not previously interrupted) will be rendered effective when hopper contact 61 next touches contact 65.

Closure of contacts 31', 35'' establishes a path (including closed contacts 49 of relay ERR) for energization of magnet *e*.

Energization of said magnet *e* causes closure of contacts 51 and 53, and opening of shunting contacts 55.

Closure of contacts 51 establishes a lock-up path for maintaining energization of magnet *e*, notwithstanding subsequent operations of contacts 31', 35''.

Closure of contacts 53 completes a path for application through contacts 21', 23', 25', of intermediate current source potential to conductors 221', 223'.

There is no immediate significant consequence of the closure of the path to the intermediate current source potential other than in the event that one or the other of the magnets $f'$, $f''$ is deenergized at the time resultant from signal formulating activity of some other originating circuit. However, during such closure, said magnet $f'$ will be unaffected by signal formulations either in higher numbered circuits or such as may cause response of relay ULR of the same circuit, and magnet $f''$ will be unaffected by lower numbered circuits.

Opening of contacts 55 renders continuity of the paths 221′ and 223′ dependent upon contacts 21′, 23′, 25′ of relay ELR, so that the governing of the general responsive mechanism GR′, GR″ by such active relay ELR will thereafter be the same as by a relay ULR under corresponding circumstances.

Energization of the magnet $c$ of a relay ELR continuing until arm 77 moves contact 61 against contact 65 of the hopper assembly H, will result in action of the associated emergency restoring relay ERR corresponding to the action of a usual path restoring relay URR resultant from continued deenergization of the magnet $c$ of the associated line relay ULR.

In the operation of the system of Fig. 9, signal formulation exclusively in the usual path of any one originating circuit, or, concurrently, in the usual paths of two or more originating circuits, will result in operation corresponding to that resultant from similar formulations in one or more circuits of systems such, for example, as those of Figs. 4 or 6.

When the usual current path of an originating circuit has been ruptured, if a signal is formulated between the ground and a portion of the circuit which provides an unimpaired current path including the magnet $c$ of the relay ULR, response to such signal will be substantially the same as if such signal had been formulated in an originating circuit of a system, such as the systems of Figs. 4 or 6.

In the event of formulation of a signal in a path causing energization of the magnet $c$ of the emergency relay ELR; the results of the initial energization of said magnet will be as above described and, the results of ensuing deenergizations of said magnet incidental to signal formulation will be substantially the same as if such signal had been formulated in an originating circuit of a system such as the systems of Figs. 4 or 6.

Figure 10:
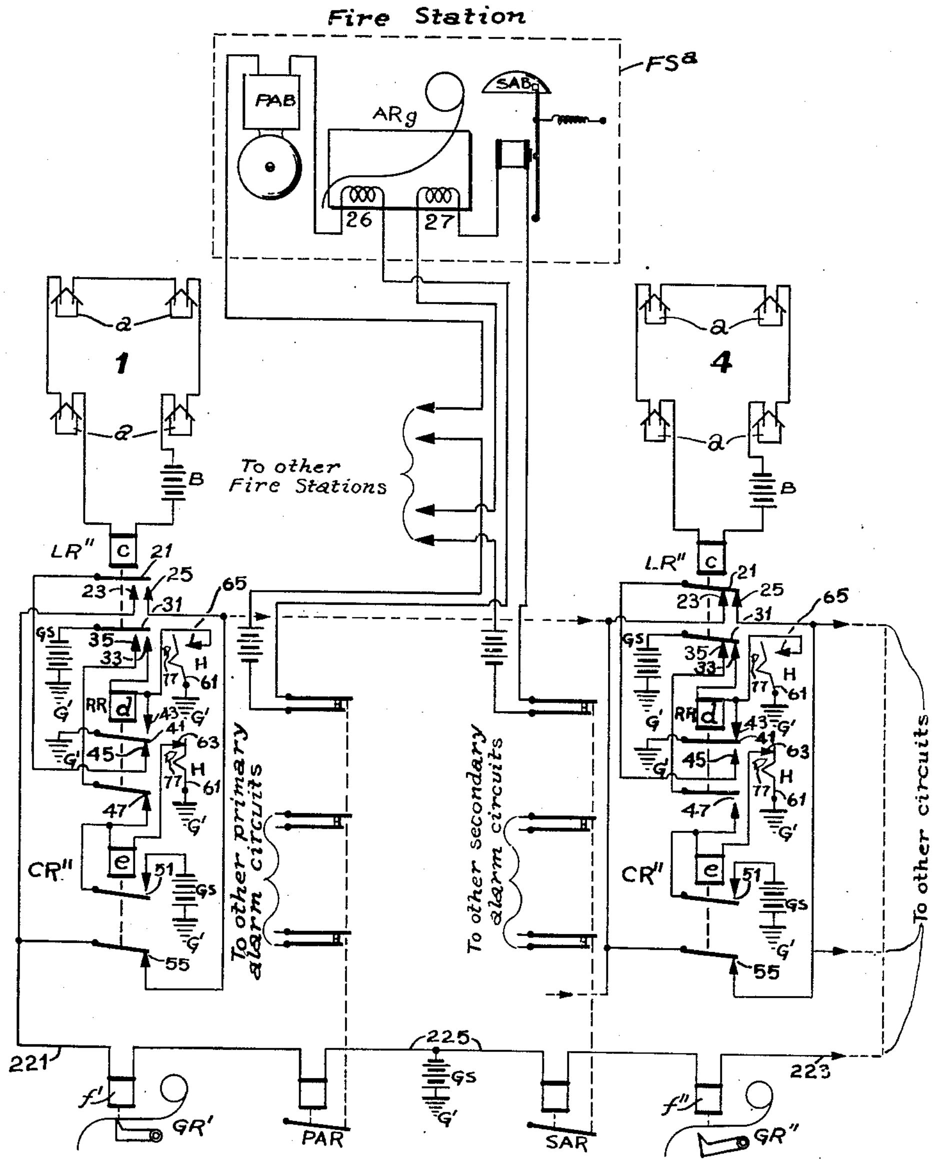
Fig. 10 is a diagram indicating a system similar to that of Fig. 6, in which primary and secondary alarm circuits may be rendered responsive, in common, to a group of originating lines.

*Detailed description of Fig. 10*

In the foregoing descriptions of various embodiments of this invention, reference has been specially made to general manifesting mechanism exemplified by registering mechanism GR′, GR″, although reference has also been repeatedly made to the use of repeating mechanism in place of or supplemental to such registering mechanism.

The system of Fig. 10 shows association of a primary alarm repeater PAR and a secondary alarm repeater SAR in association with general registering mechanism GR′, GR″.

The arrangement of the conductors of circuits 1 and 4, and of equipment associated therewith, corresponds with that shown in Fig. 6, and hereinbefore more fully described.

The primary alarm repeater PAR comprises pairs of contacts for such primary alarm circuits as are to be governed thereby, and the secondary alarm repeater SAR comprises like pairs of contacts for secondary alarm circuits.

At each of the fire stations (such as FS[a]), there is a primary alarm bell PAB, a secondary alarm bell SAB and a two circuit register AR$g$, which may be of the type of the register shown by King Patent 1,664,933, hereinbefore referred to, and having magnet windings 26 and 27, as indicated in said King patent.

Under normal conditions, all originating circuits being closed, and the mechanisms governed by magnets $f'$ and $f''$ being at rest, the primary and secondary alarm circuits are closed, and the magnets of the bells PAB and SAB, as well as the magnets 26 and 27 of the register, are energized.

Formulation of a signal in any originating circuit will result in response of the mechanisms GR′, GR″ in a manner such as hereinbefore more fully explained.

Furthermore, the bells PAB and SAB in each fire house will simultaneously respond to the strokes of such signal, and both markers of the register AR$g$ will record such signal strokes side-by-side on the tape of said register.

Should signal formulation start simultaneously in two originating circuits (as, for example, circuits 1 and 4 here shown) the primary alarm repeater PAR will act in unison with general recording mechanism GR′, causing manifestation of the signal formulated in circuit 1 by the bell PAB and by the marker governed by magnet 26.

Secondary alarm repeater SAR will act in unison with general recording mechanism GR″, causing manifestation of the signal formulated in circuit 4 by the bell SAB and the marker governed by magnet 27.

From the foregoing it will be seen that manifestations by the bell PAB and by the marker governed by magnet 26 will at all times correspond with those governed by the magnet $f'$, and manifestations by the bell SAB and by the marker governed by magnet 27 will correspond with those of the general recording mechanism governed by the magnet $f''$, under all of the various operating conditions hereinbefore described in greater detail. Hence, fire station response may proceed at the conclusion of the first formulation or so-called "round" of any signal, if the side-by-side manifestations of that signal as governed by magnets 26 and 27 are identical. Otherwise, fire station response should be delayed until one marker or the other has made two consecutive recordals of the same code signal.

Figure 11:
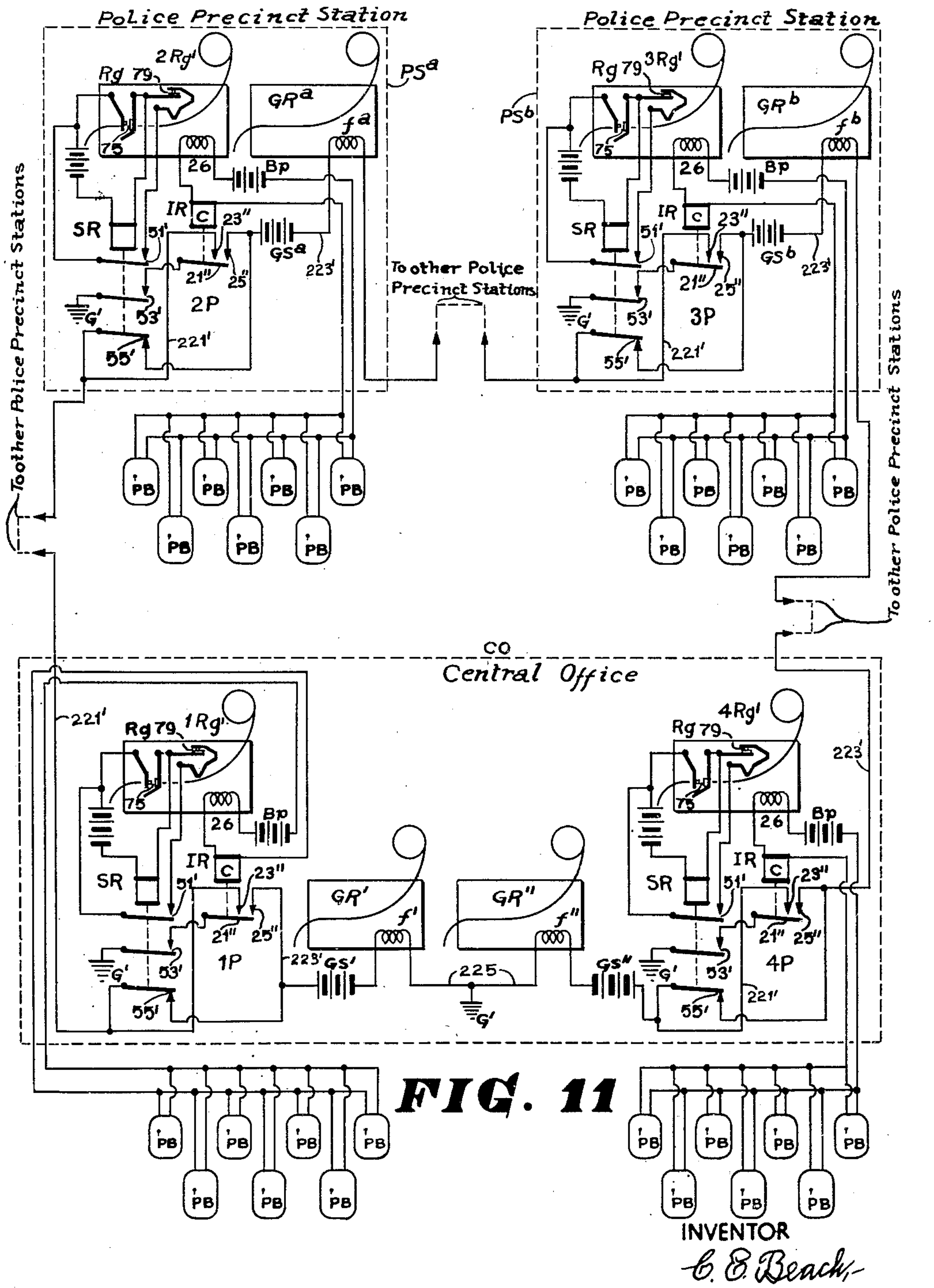
Fig. 11 is a diagram indicating a manner of applying certain aspects of this invention to a police signaling system having a central office and a plurality of distant precinct stations.

*Detailed description of Fig. 11*

This invention may be advantageously applied to a police signaling system having a central office and one or more precinct stations, in a manner such as that indicated in Fig. 11; in which, central office equipment is indicated within a dotted outline CO, and precinct station equipments are indicated within dotted outlines PS[a] and PS[b].

Circuits 1P and 4P are directly served by the central office, and circuits 2P and 3P are directly served by precinct stations PS[a] and PS[b], respectively.

Each police box circuit connects a desired number of police boxes PB and includes a current source represented by the battery B$p$, a magnet 26 of a police register R$g'$ and the windings of a magnet $c$ of an impulse relay IR.

Each register R$g'$ is equipped with contacts 75 and contacts R$g$79 for operation by the hopper mechanism of such register. Said contacts 75 correspond generally with contacts indicated by like number in the aforesaid King patent, and are arranged for closures in response to a so-called "emergency impulse" as more fully explained in said King patent.

The contacts Rg79 correspond generally with the contacts 79 of said King patent, and are so associated with the hopper mechanism of said patent as to be momentarily operated just before said hopper mechanism acts to arrest the paper feeding mechanism of the register.

Said contacts 75 govern current flow through the winding of the magnet of the selector relay SR.

Said relay SR comprises lock-up contacts 51′ and interbattery electromotive force applying contacts 53′ which are closed incident to energization of said relay and serve purposes generally corresponding with contacts 51 and 53, respectively, of conditioning relays CR hereinbefore more fully described. The contacts 55′ of said relays SR govern a shunt path around the repeating contacts 23″ and 25″, and thus generally correspond with the contacts 55 of said conditioning relays CR.

The magnets c of the impulse relays IR are normally deenergized, so that the associated contacts 21″, 23″ 25″, are normally open, and thus generally correspond with the contacts 21, 23, 25 of the various line relays previously described; and, more particularly, with the emergency line relays ELR of Fig. 9.

The current paths for the magnets f′, f″, of the general responsive mechanism GR′, GR″, correspond generally with those shown in Figs. 3, 5, 8 and 9, said magnets f′ and f″, being normally energized.

In the operation of the system of Fig. 11, the impulse relay IR of each circuit responds to all signaling impulses formulated in its associated circuit, but such response does not affect the current path through conductors 221′ and 223′, because the register contacts 75 remain open and the selector relay SR remains deenergized.

If, however, an emergency signal is transmitted from any police box, the contacts 75 associated with the circuit of such box will be closed, with resultant energization of the selector relay SR, which will thereupon act to close its contacts 51′ and 53′, and to open its contacts 55′.

Such closure of the contacts 51′ will provide a lock-up path which will assure continued energization of the associated relay magnet notwithstanding subsequent opening of the contacts 75. Closure of said contacts 53′ will apply the intermediate current source potential to the tongue contact 21″, through the ground connections G′, G′, and the opening of the contacts 55′ will leave the continuity of the current paths for energizing the magnets f′ and f″ subject to the repeating contacts 21″, 23″, 25″ of the associated impulse relay IR.

After the emergency signal has thus been formulated in the general current path, and just before the paper feed train of the register Rg′ comes to rest, the hopper mechanism of such register will effect the operation of the contacts Rg79, and thereby cause deenergization of the selector relay SR, with resultant opening of its contacts 51′ and 53′, and closure of its contacts 55′, thus restoring the general circuit to its normal condition.

In the event that recording or other mechanism governing hopper or timing contacts such as the hopper assemblies H indicated in Figs. 6, 7, 8, 9 and 10, are of a character such that there is possibility of so-called "chatter," or of vibration such as might cause momentary separation of the hopper contacts incident to response of whatever mechanism is governed by signaling impulses in the paths 221 and 223, relays such as the conditioning relays CR should be of so-called "quick pick-up, slow release type," so that, in the event of momentary impairment or interruption of current flow through the governing magnet e of any such relay, there will be no danger that its contacts will assume deenergized positionings during formulation of any signal.

It should be correspondingly understood that wherever conditions are such that it is important that the current paths which are common to all originating circuits and which control the general mechanism (such as the paths 221 and 223), should be under constant test for their continuity (as in the instances of the decentralized systems of Figs. 3 and 11), the general arrangement of the current source and of the contacts associated with such current paths should be in general accordance with Figs. 3, 5, 8, 9, 11; but where such current paths do not extend outside of the central office building, and minimizing of drain on current supply for such paths is deemed of importance, the arrangement of such paths and the controlling contacts therefor may be in accordance with Figs. 1, 2, 4, 6, 7, and 10.

It is apparent from the foregoing description that this invention permits successful accomplishment of the objects hereinbefore stated; and that embodiments of this invention suited to other operating conditions and for accomplishing differing functions than those hereinbefore described will readily suggest themselves to those skilled in this art, in the light of the foregoing examples.

It will be correspondingly evident that this invention is not limited to the embodiments illustrated by the accompanying drawings and hereinbefore described, but that it may be variously embodied, and that various parts may be added, omitted or changed in form or arrangement or utilized in interchanged relationships without departing from the spirit of this invention.

It is also to be understood that the language used in the following claims is intended to cover all of the generic and specific features of the invention herein described and all statements of the scope of the invention, which, as a matter of language, might be said to fall therebetween.

What I therefore claim and desire to secure by Letters Patent of the United States of America is:

1. In combination: recording means comprising mechanisms suited for response to formulations of code signaling impulses in respectively associated ones of a group of originating circuits; sets of repeating contacts respectively associated for actuation by said mechanisms; means for effecting concurrent manifestations of two code signals, said second named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; and conditioning contacts rendered effective incident to functional activity of any of said mechanisms for establishing a connection between a contact of the set associated with such active mechanism and the remaining terminals of said magnets.

2. In combination: recording means comprising marking mechanisms for response to formulations of code signaling impulses in respectively associated ones of a group of originating circuits together with paper feeding means including self-starting and stopping mechanism therefor; sets of repeating contacts respectively associated for actuation by said marking mechanisms; means for effecting concurrent manifestations of two code signals, said last named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; and conditioning contacts governed by said starting and stopping mechanisms for establishing a connection between a contact of the set associated with an active one of said mechanisms and the remaining terminals of said magnets.

3. In combination: sets of repeating contacts, each set having actuating means individual thereto and suited for response to formulations of code signaling impulses in respectively associated ones of a group of originating circuits; means for effecting concurrent manifestations of two code signals, said second named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; means including sets of conditioning contacts for establishing connections between respectively associated sets of repeating contacts and the remaining terminals of said magnets; timing means for rendering said conditioning contacts effective incident to the first actuation of any set of repeating contacts significant to formulation of a code signal and for continuing such effectiveness until the expiration of a time measured by the operation of said mechanism and longer than the longest interval between impulses of any signal throughout which time there is no actuation of repeating contacts responsive to a significant signaling impulse; and current supply means of character and manner of association for effecting energization of either of said magnets responsive to the repeating contacts of any of said sets during closure of the associated conditioning contacts notwithstanding interruption of the path between such repeating contacts and the other of said magnets.

4. In combination: sets of repeating contacts, each set having actuating means individual thereto and suited for response to formulations of code signaling impulses in respectively associated ones of a group of originating circuits; means for effecting concurrent manifestations of two code signals, said second named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; means including sets of conditioning contacts for establishing connections between respectively associated sets of repeating contacts and the remaining terminals of said magnets; timing mechanism for governing the effectiveness of said conditioning contacts and rendered active incident to any impulse in either of said paths significant to initiation of code signal formulating activity and for continuing such effectiveness until the expiration of a time measured by the operation of said mechanism and longer than the longest interval between impulses of any signal throughout which time there are no significant signaling impulses in either of said paths; and current supply means of character and manner of association for effecting energization of either of said magnets responsive to the repeating contacts of any of said sets during closure of the associated conditioning contacts notwithstanding interruption of the path between such repeating contacts and the other of said magnets.

5. In combination: sets of repeating contacts, each set having actuating means individual thereto and suited for response to formulations of code signaling impulses in respectively associated ones of a group of originating circuits; means for effecting concurrent manifestations of two code signals, said second named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; means including sets of conditioning contacts for establishing connections between respectively associated sets of repeating contacts and the remaining terminals of said magnets; and timing means for rendering said conditioning contacts effective incident to the first actuation of any set of repeating contacts significant to formulation of a code signal and for continuing such effectiveness until the expiration of a time measured by the operation of said mechanism and longer than the longest interval between impulses of any signal throughout which time there is no actuation of repeating contacts responsive to a significant signaling impulse.

6. In combination: sets of repeating contacts, each set having actuating means individual thereto and suited for response to formulations of code signaling impulses in respectively associated ones of a group of originating circuits; means for effecting concurrent manifestations of two code signals, said second named means comprising electromagnets for governing respective ones of such manifestations; conductors providing current paths associating contacts of said sets in a certain order with an end of the winding of one of said magnets and in reverse order with an end of the winding of the other of said magnets for governing the continuity of such paths; means including sets of conditioning contacts for establishing connections between respectively associated sets of repeating contacts and the remaining terminals of said magnets; and timing mechanism rendered active for rendering said conditioning contacts effective incident to any impulse in either of said paths significant to initiation of code signal formulating activity and for continuing such effectiveness until the expiration of a time measured by the operation of said mechanism and longer than the longest interval between impulses of any signal throughout which time there are no significant signaling impulses in either of said paths.

7. In combination: sets of repeating contacts, each set having actuating means individual thereto and suited for response to formulations of code signaling impulses in respectively associated ones of a group of originating circuits; means comprising markers having governing electromagnets for effecting concurrent manifestations of two code signals, together with paper feeding means including self-starting and stopping mechanism therefor; conductors providing current paths associating contacts of said sets in a certain order with an end of the winding of one of said magnets and in reverse order with an end of the winding of the other of said magnets for governing the continuity of such paths; and conditioning contacts governed by said starting and stopping mechanism for governing connections between the remaining terminals of said magnets with contacts of said sets.

8. A multi-orginating circuit signaling system having, in combnation: means for effecting concurrent manifestations of two code signals, said means comprising electromagnets for governing respective ones of such manifestations; a circuit comprising a current path connecting an end of the winding if one of said magnets with an end of the winding of the other of said magnets and an interconnection between the remaining ends of said windings; sets of repeating contacts, each set having actuating means individual thereto and suited for response to formulations of code signaling impulses in respectively associated ones of a group of originating circuits, contacts of said sets being associated with said path for governing the continuity thereof; sets of conditioning contacts rendered effective incident to functional activity of said repeating contact actuating means for establishing connections between respectively associated sets of repeating contacts and said interconnection; current supply units associated with said circuit in portions thereof adjacent said magnets; and supplemental units for effecting manifestations of code signals, each of said units comprising an electromagnet serially connected in said path.

9. A multi-orginating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; sets of repeating contacts, each set having actuating means individual thereto and suited for response to formulations of code signaling impulses in respectively associated ones of a group of originating circuits, contacts of said sets being associated with said path for governing the continuity thereof; sets of conditioning contacts rendered effective incident to functional activity of said repeating contact actuating means for establishing connections between respectively associated sets of repeating contacts and said interconnection; current supply units associated with said circuit in portions thereof adjacent said magnets; supplemental units for effecting manifestations of code signals, each of said units comprising an electromagnet serially connected in said path; and supplemental units of current supply means serially connected in portions of said circuit adjacent magnets of said supplemental manifestation units.

10. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets; recording means comprising mechanisms suited for response to formulations of code signaling impulses in respectively associated ones of a group of originating circuits and paper feeding mechanisms rendered active incident to such response and thereafter until the expiration of a time measured by the operation of said feeding mechanisms and longer than the longest interval between impulses of any signal; sets of repeating contacts respectively associated for actuation by said first named mechanisms, contacts of said sets being associated with said path for governing the continuity thereof; sets of conditioning contacts individually associated with said feeding mechanisms for closure incident to activity thereof; and current supply means of character and manner of association for effecting energizations of either of said magnets responsive to closures of the repeating contacts of any of said sets during closure of the associated conditioning contacts notwithstanding interruption of said path between such contacts and the other of said magnets.

11. A multi-orginating circuit signaling system having, in cobination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; recording means comprising mechanisms suited for response to formulations of code signaling impulses in respectively associated ones of a group of originating circuits and paper feeding mechanisms rendered active incident to such response and thereafter until the expiration of a time measured by the operation of said feeding mechanism and longer than the longest interval between impulses of any signal; sets of repeating contacts respectively associated for actuation by said first named mechanisms, contacts of said sets being associated with said path for governing the continuity thereof; and sets of conditioning contacts individually associated with said feeding mechanisms for closure incident to activity thereof for establishing connections between respectively associated sets of repeating contacts and said interconnection.

12. In combination: means for effecting concurrent manifestations of two code signals, said means comprising electromagnets for governing respective ones of such manifestations; a circuit comprising a current path connecting an end of the winding of one of said magnets with an end of the winding of the other of said magnets; repeating equipment comprising sets of repeating contacts and sets of conditioning contacts individually associated therewith, each set of repeating contacts having actuating means individual thereto and suited for response to formulations of code signaling impulses in respectively associated ones of a group of originating circuits and said sets of conditioning contacts being rendered effective incident to functional activity of said repeating contact actuating means, contacts of said repeating sets being associated in parallel relationship with contacts of said conditioning sets for governing the continuity of said path;

and means including said conditioning contacts and rendered effective incident to actuation of any set of said repeating contacts for establishing a connection between a contact of such set and the remaining terminals of said magnets.

13. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; sets of repeating contacts associated with respective ones of said originating circuits for response to signaling impulses formulated therein, said sets of contacts associated with said first named circuit for governing the continuity of said path and for establishing a path therefrom to said interconnection; and means including timing mechanism rendered active incident to functionally significant repeating contact action for rendering the active repeating contacts functionally effective and for thereafter causing termination of such effectiveness only after the expiration of a predetermined time following termination of such repeating contact activity.

14. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; sets of repeating contacts associated with respective ones of said originating circuits for response to signaling impulses formulated therein, said sets of contacts associated with said first named circuit for governing the continuity of said path and for establishing a path therefrom to said interconnection; and means including timing mechanism rendered active incident to functionally significant repeating contact action for rendering the active repeating contacts functionally effective and for thereafter causing termination of such effectiveness and rendering said first named path unaffected by the associated repeating contacts only after the expiration of a predetermined time following termination of such repeating contact activity.

15. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof; timing mechanism rendered active incident to significant action of any of said line relays; and means, involving said timing mechanism and said conditioning relays for accomplishing full effectiveness of the repeating contacts of said line relays only incident to action of a line relay such as characterizes the response of such relay to the initiation of a code signal in its associated originating circuit and for thereafter continuing such effectiveness for a time throughout which there is no action of such previously active line relay in response to a significant signaling impulse in its associated originating circuit.

16. A multi-originating circuit signaling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof together with contacts for governing a current path from said interconnection to said repeating contacts; timing mechanism rendered active incident to significant action of any of said line relays; and means, involving said timing mechanism and said conditioning relays for accomplishing full effectiveness of the repeating contacts of said line relays only incident to action of a line relay such as characterizes the response of such relay to the initiation of a code signal in its associated originating circuit and for thereafter continuing such effectiveness for a predetermined time throughout which time there is no action of such previously active line relay in response to a significant signaling impulse in its associated originating circuit.

17. A multi-originating circuit signaling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays, each of said conditioning relays comprising contacts for governing a lock-up path for maintaining energization thereof together with contacts for governing a current path from said interconnection to said repeating contacts; timing mechanism rendered active incident to significant action of any of said line relays; and means, involving said timing mechanism and said conditioning relays for accomplishing full effectiveness of the repeating contacts of said line relays only incident to action of a line relay such as characterizes the response of such relay to the initiation of a code signal in its associated originating circuit and for thereafter continuing such effectiveness for a predetermined time throughout which time there is no action of such previously active line relay in response to a significant signaling impulse in its associated originating circuit.

18. A multi-originating circuit signaling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof, each of said conditioning relays comprising contacts for governing a lock-up path for maintaining energization thereof; timing mechanism rendered active incident to significant action of any of said line relays; and means, involving said timing mechanism and said conditioning relays for accomplishing full effectiveness of the repeating contacts of said line relays only incident to action of a line relay such as characterizes the response of such relay to the initiation of a code signal in its associated originating circuit and for thereafter continuing such effectiveness for a predetermined time throughout which time there is no action of such previously active line relay in response to a significant signaling impulse in its associated originating circuit.

19. A multi-originating circuit signalling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof, each of said conditioning relays comprising contacts for governing a lock-up path for maintaining energization thereof together with contacts for governing a current path from said interconnection to said repeating contacts; timing mechanism rendered active incident to significant action of any of said line relays; and means, involving said timing mechanism and said conditioning relays for accomplishing full effectiveness of the repeating contacts of said line relays only incident to action of a line relay such as characterizes the response of such relay to the initiation of a code signal in its associated originating circuit and for thereafter continuing such effectiveness for a predetermined time throughout which time there is no action of such previously active line relay in response to a significant signaling impulse in its associated originating circuit.

20. A multi-originating circuit signaling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof, each of said conditioning relays comprising contacts for governing a lock-up path for maintaining energization thereof; means involving said line relays and rendered effective incident to significant action thereof for initiating energizations of respective associated conditioning relays and for thereafter maintaining such energization irrespective of subsequent line relay action responsive to code signaling impulses; restoring relays associated with respective ones of said line relays for when energized rendering said current path unaffected by the associated repeating contacts; and timing mechanism rendered active incident to significant signalling impulses in said current path for effecting termination of energizations of conditioning relays and for initiating energizations of restoring relays only after the expiration of a predetermined time measured by the operation of said mechanism throughout which time no significant signaling impulse occurs in said current path.

21. A multi-originating circuit signaling system having, in combination: means for effecting concurrent manifestations of two code signals, said means comprising electro-magnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof, each of said conditioning relays comprising contacts for governing a lock-up path for maintaining energization thereof together with contacts for governing a current path from said interconnection to said repeating contacts; means involving said line relays and rendered effective incident to signficant action thereof for initiating energizations of respective associated conditioning relays and for thereafter maintaining such energization irrespective of subsequent line relay action responsive to code signaling impulses; restoring relays associated with respective ones of said line relays for when energized rendering said current path unaffected by the associated repeating contacts; and timing mechanism rendered active incident to signficant signaling impulses in said current path for effecting termination of energizations of conditioning relays and for initiating energizations of restoring relays only after the expiration of a predetermined time measured by the operation of said mechanism, throughout which time no significant signaling impulse occurs in said current path.

22. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein, each of said relays having repeating contacts for governing the continuity of said path and for establishing a path therefrom to said interconnection; conditioning relays associated with respective ones of said line relays for governing the effectiveness of the repeating contacts thereof, each of said conditioning relays comprising contacts for governing a lock-up path for maintaining energization thereof together with contacts for governing a current path from said interconnection to said repeating contacts; means involving said line relays and said lock-up contacts and rendered effective incident to significant action thereof, for initiating energizations of respective associated conditioning relays and for thereafter maintaining such energization irrespective of subsequent line relay action responsive to code signaling impulses; restoring relays associated with respective ones of said line relays for when energized rendering said current path unaffected by the associated repeating contacts; and timing mechanism rendered active incident to significant signaling impulses in said current path for effecting termination of energizations of conditioning relays and for initiating energizations of restoring relays only after the expiration of a predetermined time measured by the operation of said mechanism and longer than the longest interval between impulses of any signal, throughout which time no significant signaling impulse occurs in said current path.

23. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein; supplemental repeating relays associated with respective ones of said line relays for response to operation thereof, each of said supplemental relays having repeating contacts for governing the continuity of said path and for establishing a path therefrom to said interconnection; conditioning relays associated with respective ones of said repeating relays for governing the effectiveness of the repeating contacts thereof; each of said conditioning relays comprising contacts for governing a lock-up path for maintaining energization thereof; means involving said supplemental relays and rendered effective incident to significant action thereof for initiating energizations of respectively associated conditioning relays and for thereafter maintaining such energization irrespective of subsequent supplemental relay action responsive to code signaling impulses; restoring relays associated with respective ones of said repeating relays for when energized rendering said current path unaffected by the associated repeating contacts; and timing mechanism rendered active incident to significant signaling impulses in said current path for effecting termination of energizations of conditioning relays and for initiating energizations of restoring relays only after the expiration of a predetermined time measured by the operation of said mechanism and longer that the longest interval between impulses of any signal throughout which time no repeating relay acts in response to signaling impulses.

24. A multi-originating circuit signaling system having, in combination: means for effecting concurrent manifestations of two code signals, said means comprising electromagnets for governing respective ones of such manifestations; a circuit comprising a current path connecting an end of the winding of one of said magnets with an end of the winding of the other of said magnets and an interconnection between the remaining ends of said windings; a plurality of originating circuits; line relays associated with respective ones of said originating circuits for response to signaling impulses formulated therein; supplemental repeating relays associated with respective ones of said line relays for response to operation thereof, each of said supplemental relays having repeating contacts for governing the continuity of said path and for establishing a path therefrom to said interconnection; conditioning relays associated with respective ones of said repeating relays for governing the effectiveness of the repeating contacts thereof; each of said conditioning relays comprising contacts for governing a lock-up path for maintaining energization thereof together with contacts for governing a current path from said interconnection to said repeating contacts; means involving said supplemental relays and rendered effective incident to significant action thereof for initiating energizations of respectively associated conditioning relays and for thereafter maintaining such energization irrespective of subsequent supplemental relay action responsive to code signaling impulses; restoring relays associated with respective ones of said repeating relays for when energized rendering said first mentioned path unaffected by the associated repeating contacts; and means including timing mechanism rendered active incident to significant signaling impulses in said first mentioned path for effecting termination of energizations of conditioning relays and for initiating energizations of restoring relays only after the expiration of a predetermined time measured by the operation of said mechanism and longer than the longest interval between impulses of any signal throughout which time no repeating relay acts in response to signaling impulses.

25. In combination: sets of repeating contacts, each set comprising means for governing a three-way interconnection and having actuating means responsive to formulations of code signaling impulses in an individually associated one of a group of originating circuits; means for effecting concurrent manifestations of two code signals, said last named means comprising electromagnets for governing respective ones of such manifestations; conductors providing current paths associating certain contacts of said sets in path-continuity-governing relationship in a certain order with an end of the winding of one of said magnets and in reverse order with an end of the winding of the other of said magnets and for establishing paths between other contacts of said sets and an interconnection between the remaining ends of said windings; timing mechanism involving means rendered effective incident to impulses significant of commencement of originating circuit code signal formulation for initiating activity of said timing mechanism; means for effecting continuance of such timing mechanism activity until the expiration of a time measured by the operation of said timing mechanism and longer than the longest interval between impulses of any signal throughout which time said timing mechanism is not affected by originating circuit signal formulating activity; and means including sets of conditioning contacts for restricting the effectiveness of respectively associated sets of repeating contacts, said last named means functionally associated for response to originating circuit code signal initiating impulses and subject to governing action of said timing mechanism.

26. In combination: sets of repeating contacts, each set comprising means for governing a three-way interconnection and having actuating means responsive to formulations of code signaling impulses in an individually associated one of a group of originating circuits; means for effecting concurrent manifestations of two code signals, said last named means comprising electromagnets for governing respective ones of such manifestations; conductors providing current paths associating certain contacts of said sets in path-continuity-governing relationship in a certain order with an end of the winding of one of said magnets and in reverse order with an end of the winding of the other of said magnets and for establishing paths between other contacts of said sets and an interconnection between the remaining ends of said windings; timing mechanism involving means rendered effective incident to impulses significant of commencement of originating circuit code signal formulation for initiating activity of said timing mechanism; means for effecting continuance of such timing mechanism activity until the expiration of a time measured by the operation of said timing mechanism and longer than the longest interval between impulses of any signal throughout which time said timing mechanism is not affected by originating circuit signal formulating activity; means including sets of conditioning contacts for restricting the effectiveness of respectively associated sets of repeating contacts, said last named means functionally associated for response to originating circuit code signal initiating impulses and subject to governing action of said timing mechanism; and current supply means of character and manner of association for effecting energization of either of said magnets responsive to the repeating contacts of any of said sets during effectiveness of a current path between a contact of such set and the first named end of the winding of said magnet notwithstanding lack of a corresponding path between such set of contacts and the corresponding end of the winding of the other of said magnets.

27. In combination: sets of repeating contacts, each set comprising means for governing a three-way interconnection and having actuating means responsive to formulations of code signaling impulses in an individually associated one of a group of originating circuits; means for effecting concurrent manifestations of two code signals, said last named means comprising electromagnets for governing respective ones of such manifestations; conductors providing current paths associating certain contacts of said sets in path-continuity-governing relationship in a certain order with an end of the winding of one of said magnets and in reverse order with an end of the winding of the other of said magnets and for establishing paths between other contacts of said sets and an interconnection between the remaining ends of said windings; conditioning relays for when energized rendering effective respectively associated sets of repeating contacts, said relays functionally associated for energization responsive to originating circuit code signal initiating impulses and having a lock-up path for maintaining such energization irrespective of subsequent originating circuit impulses; timing mechanism involving means for initiating activity thereof incident to significant action of any of said repeating contacts; means involving said timing mechanism for effecting termination of energizations of conditioning relays only after the expiration of a predetermined time measured by the operation of said timing mechanism and longer than the longest interval between impulses of any signal throughout which time there is no significant action of previously active repeating contacts; and current supply means of character and manner of association for effecting energization of either of said magnets responsive to the repeating contacts of any of said sets during effectiveness of a current path between such contacts and said magnet notwithstanding lack of a corresponding path between such repeating contacts and the other of said magnets.

28. In combination: sets of repeating contacts, each set comprising means for governing a three-way interconnection and having actuating means responsive to formulations of code signaling impulses in an individually associated one of a group of originating circuits; means for effecting concurrent manifestations of two code signals, said last named means comprising electromagnets for governing respective ones of such manifestations; conductors providing current paths associating certain contacts of said sets in path-continuity-governing relationship in a certain order with an end of the winding of one of said magnets and in reverse order with an end of the winding of the other of said magnets and for establishing paths between other contacts of said sets and an interconnection between the remaining ends of said windings; conditioning relays for when energized rendering effective respectively associated sets of repeating contacts, said relays functionally associated for energization responsive to originating circuit code signal initiating impulses and having a lock-up path for maintaining such energization irrespective of subsequent originating circuit impulses; restoring relays associated with respective sets of repeating contacts for when energized rendering ineffective the associated set of repeating contacts; timing mechanism involving means for initiating activity thereof incident to significant action of any of said repeating contacts; means involving said timing mechanism for effecting termination of energizations of conditioning relays and for initiating energizations of restoring relays only after the expiration of a predetermined time measured by the operation of said timing mechanism and longer than the longest interval between impulses of any signal throughout which time there is no significant action of previously active repeating contacts; and current supply means of character and manner of association for effecting energization of either of said magnets responsive to the repeating contacts of any of said sets during effectiveness of a current path between such contacts and said magnet notwithstanding lack of a corresponding path between such repeating contacts and the other of said magnets.

CLARENCE E. BEACH.

REFERENCES CITED

The following references are of record in the file of this patent:

UNITED STATES PATENTS

| Number | Name | Date |
|---|---|---|
| 1,467,301 | Beach | Sept. 11, 1903 |
| 1,786,524 | Durbin | Dec. 30, 1930 |
| 1,870,988 | Durbin | Aug. 9, 1932 |
| 2,034,017 | Beach | Mar. 17, 1936 |
| 2,114,324 | Weld | Apr. 19, 1938 |
| 2,223,103 | Hailes | Nov. 26, 1940 |
| 2,287,816 | Muehter | June 30, 1942 |

FOREIGN PATENTS

| Number | Country | Date |
|---|---|---|
| 352,632 | Great Britain | July 16, 1931 |
| 685,422 | Germany | Dec. 18, 1939 |